United States Patent
Resnick et al.

(10) Patent No.: US 12,347,194 B2
(45) Date of Patent: Jul. 1, 2025

(54) AUTOMATED GENERATION OF HAPTIC EFFECTS BASED ON HAPTICS DATA

(71) Applicant: Disney Enterprises, Inc., Burbank, CA (US)

(72) Inventors: David S. Resnick, Los Angeles, CA (US); Bryce Horwood, Shoreline, WA (US); Keith J. Comito, Seaford, NY (US); Steve Sang-Hyuck Lee, Ann Arbor, MI (US); Nicholas M. Arciero, Los Angeles, CA (US); Joseph A. Inzerillo, Brooklyn, NY (US); Frederik S. Boll, Los Angeles, CA (US); Gad Rouache, Los Angeles, CA (US); Samuel J. Reisner, Farmington, CT (US)

(73) Assignees: Disney Enterprises, Inc., Burbank, CA (US); Hulu, LLC, Santa Monica, CA (US)

( * ) Notice: Subject to any disclaimer, the term of this patent is extended or adjusted under 35 U.S.C. 154(b) by 0 days.

(21) Appl. No.: 17/818,283

(22) Filed: Aug. 8, 2022

(65) Prior Publication Data

US 2023/0039530 A1 Feb. 9, 2023

Related U.S. Application Data

(60) Provisional application No. 63/231,142, filed on Aug. 9, 2021.

(51) Int. Cl.
*G06V 20/40* (2022.01)
*G06F 3/01* (2006.01)
(Continued)

(52) U.S. Cl.
CPC .............. *G06V 20/44* (2022.01); *G06F 3/016* (2013.01); *G06V 10/7715* (2022.01); *G08B 6/00* (2013.01); *H04N 21/4104* (2013.01)

(58) Field of Classification Search
CPC ...... H04N 21/4104; G08B 6/00; G06F 3/016; G06V 10/7715; G06V 20/44
(Continued)

(56) References Cited

U.S. PATENT DOCUMENTS

| 10,013,857 B2 * | 7/2018 | Sridhara | H04N 21/235 |
| 2003/0058216 A1 * | 3/2003 | Lacroix | G06F 3/016 345/156 |

(Continued)

OTHER PUBLICATIONS

Camille Moussette, "Simple Haptics: Sketching Perspectives for the design of Haptic Interactions," Thesis for the Degree of Doctor of Philosophy in Industrial Design, Dated: Oct. 2012, pp. 1-284.
(Continued)

*Primary Examiner* — John W Miller
*Assistant Examiner* — Omer Khalid
(74) *Attorney, Agent, or Firm* — Patterson + Sheridan, LLP

(57) ABSTRACT

Embodiments provide systems and techniques for automated generation of haptic effects based on haptics data. An example technique includes obtaining a set of haptic data associated with media content being streamed to a computing device. The media content is displayed on the first computing device. One or more haptic effects are generated using one or more haptic devices while displaying the media content, based on the set of haptic data. One or more parameters of the one or more haptic effects is adjusted when a predetermined condition(s) is satisfied.

20 Claims, 10 Drawing Sheets

(51) Int. Cl.
   *G06V 10/77* (2022.01)
   *G08B 6/00* (2006.01)
   *H04N 21/41* (2011.01)
(58) Field of Classification Search
   USPC .......................................................... 348/552
   See application file for complete search history.

(56) References Cited

U.S. PATENT DOCUMENTS

| | | | |
|---|---|---|---|
| 2008/0062143 A1* | 3/2008 | Shahoian ................. | G06F 1/169 |
| | | | 345/173 |
| 2009/0096632 A1* | 4/2009 | Ullrich ................... | H04N 21/81 |
| | | | 340/407.1 |
| 2014/0347176 A1* | 11/2014 | Modarres ................. | G06F 3/165 |
| | | | 340/407.1 |
| 2015/0242608 A1* | 8/2015 | Kim ....................... | G06F 13/102 |
| | | | 726/19 |
| 2017/0232338 A1 | 8/2017 | Goslin et al. | |
| 2017/0242483 A1 | 8/2017 | Goslin et al. | |
| 2017/0301140 A1 | 10/2017 | Smith et al. | |
| 2017/0345195 A1 | 11/2017 | Eatedali et al. | |
| 2018/0124370 A1 | 5/2018 | Bejot | |
| 2018/0151036 A1 | 5/2018 | Cha et al. | |
| 2018/0165925 A1 | 6/2018 | Israr et al. | |
| 2018/0196523 A1 | 7/2018 | Arana et al. | |
| 2018/0280793 A1 | 10/2018 | Panec et al. | |
| 2019/0056780 A1 | 2/2019 | Bombard et al. | |
| 2019/0066359 A1 | 2/2019 | Chen et al. | |
| 2019/0066387 A1 | 2/2019 | Grossmann et al. | |
| 2019/0114064 A1 | 4/2019 | Monibi | |
| 2019/0139281 A1 | 5/2019 | Chapman et al. | |
| 2019/0171302 A1* | 6/2019 | Su .......................... | G06F 3/016 |
| 2019/0379878 A1 | 12/2019 | Chapman et al. | |
| 2020/0019370 A1 | 1/2020 | Doggett et al. | |
| 2020/0064922 A1 | 2/2020 | Nocon et al. | |
| 2020/0142484 A1* | 5/2020 | Maalouf ................. | G06F 3/013 |
| 2020/0298113 A1* | 9/2020 | Smithers ............ | H04N 21/4312 |
| 2021/0397260 A1* | 12/2021 | Birnbaum ................ | H04L 51/06 |
| 2022/0113801 A1* | 4/2022 | Bharitkar ................ | G06F 3/016 |
| 2024/0033624 A1* | 2/2024 | Phillips ................. | A63F 13/355 |

OTHER PUBLICATIONS

Ali Israr, Siyan Zhao, Kaitlyn Schwalje, Roberta Klatzky, and Jill Lehman. 2014. Feel effects: Enriching storytelling with haptic feedback. ACM Trans. Appl. Percept. 11, 3, Article 11 (Sep. 2014), 17 pages. DOI: http://dx.doi.org/10.1145/2641570.

Siyan Zhao et al., "FeelCraft: Crafting Tactile Experiences for Media using a Feel Effect Library," UIST '14, Dated Oct. 5-8, 2014, pp. 1-2 http://dx.doi.org/10.1145/2658779.2659109.

D. Reusser et al., "Feeling Fireworks," UIST'17 Adjunct, Dated Oct. 22-25, 20107, pp. 1-3.

Nesra Yannier et al., "FeelSleeve: Haptic Feedback to Enhance Early Reading," ResearchGate, Dated: Apr. 2015, pp. 1-11 DOI: 10.1145/2702123.2702396.

Paul Bach-y-Rita et al., "Form perception with a 49-point electrotactile stimulus array on the tongue: A technical note," Journal of Rehabilitation Research and Development vol. 35 No. 4, Oct. 1998 pp. 427-430.

Youngjun Cho, "Haptic Cushion: Automatic Generation of Vibrotactile Feedback Based on Audio Signal for Immersive Interaction with Multimedia," Creative Innovation Center, Dated: Jun. 2014, pp. 1-5.

Nooshin Jafari et al., "Haptics to improve task performance in people with disabilities: A review of previous studies and a guide to future research with children with disabilities," Journal of Rehabilitation and Assistive Technologies Engineering vol. 3: 1-13, Year: 2016.

"Haptics in Touch Screen Hand-Held Devices," Immersion, Dated Aug. 2017, pp. 1-10.

"Haptics White Paper: Improving the Mobile User Experience through Touch," Immersion, Year: 2010, pp. 1-12.

M. McLinden, "Mediating haptic exploratory strategies in children who have visual impairment and intellectual disabilities," Journal of Intellectual Disability Research, vol. 56 Part 2, Dated: Feb. 2012, pp. 129-139.

David Navarre et al., "A Formal Description of Multimodal Interaction Techniques for Immersive Virtual Reality Applications," IFIP International Federation for Information Processing, Year: 2005, pp. 170-183.

Geraldine Dawson et al., "Interventions to Facilitate Auditory, Visual, and Motor Integration in Autism: A Review of the Evidence," Journal of Autism and Developmental Disorders, vol. 30, No. 5, 2000, pp. 1-7.

Kathryn Linn Geurts, "On Rocks, Walks, and Talks in West Africa: Cultural Categories and an Anthropology of the Senses," American Anthropological Association, Year: 2003, pp. 178-198.

Priscialla Ramsamy et al., "Using Haptics to Improve Immersion in Virtual Environments," Centre for Advanced Computing and Emerging Technologies, Year: 2006, pp. 603-609.

Grace T. Baranek, "Efficacy of Sensory and Motor Interventions for Children with Autism," Journal of Autism and Developmental Disorders, vol. 32, No. 5, Oct. 2002, pp. 397-422.

Grace Iarocci et al., "Sensory Integration and the Perceptual Experience of Persons with Austim," Journal of Autism and Developmental Disorders, vol. 36, No. 1, Jan. 2006, pp. 77-90.

Crétien van Campen, "Synesthesia and Artistic Experimentation," Psyche, 3(6), Nov. 1997, pp. 1-8.

S. Zhao et al., Using Haptic Inputs to Enrich Story Listening for Young Children, IDC'Jun. 21-25, 15, 2015, pp. 1-4.

"Vision Substitution by Tactile Image Projection," Nature, vol. 221, Mar. 8, 1969, pp. 963-964.

"A Theater Experience in the Palm of your Hands," Immersion, Year: 2017, pp. 1-7.

Sanya Attari et al., "Advancing Haptic Design: Focusing on Human Interpretations of Tactile Effects," Immersion, Dated Accessed: Nov. 4, 2022, pp. 1-10.

"Framework: Core Haptics: Compose and Play Haptic Patterns to Customize your IOS app's Haptic Feedback," Apple Developer, Year: 2022, pp. 1-7.

Chris Morris, "Wild new haptic feedback VR vest looks like something out of Ready Plater One," Digitaltrends, Dated: Jan. 11, 2021, pp. 1-16.

"The Next Generation of Hearing Science," Neosensory, Date Accessed: Nov. 4, 2022, pp. 1-6 <https://neosensory.com/>.

Oliver Schneider et al., "Tactile Animation by Direct Manipulation of Grid Displays," UIST'15, Nov. 8-11, 2015, pp. 1-10, https://dx.doi.org/10.1145/2807442.2807470.

J. M. Weisenberger et al., "Evaluation of two multichannel tactile aids for the hearing impaired," J Acoust Soc Am. Nov. 1989;86(5):1764-75. doi: 10.1121/1.398608. [Abstract Only].

Peter Shull et al., "Haptic Wearables as Sensory Replacement, Sensory Augmentation and Trainer—A review," Journal of NeuroEngineering and Rehabilitation (2015) 12:59 DOI 10.1186/s12984-015-0055-z.

Matthew Hutson, "Here's What the Future of Haptic Technology Looks (or rather, feels} Like, " Smithsonian Magazine, Dated: Dec. 28, 2018, pp. 1-10.

Chris Ullrich, "The Haptic Stack—Software Layer," Immersion, Dated: May 13, 2020, pp. 1-6.

Chris Ullrich, "The Haptic Stack," Immersion, Dated: Feb. 12, 2020, pp. 1-6.

"Human Augmentation Technologies & Sensory Enhancements," CyborgNest, Date Accessed: Nov. 4, 2022, pp. 1-5 https://www.cyborgnest.net/.

Gwydion ap Dafydd, "Pushing Innovation in Haptic DSP with Predictive Analysis," Lofelt, Dated: May 6, 2020, pp. 1-3.

Eric Gunther, "Skinscape: A Tool for Composition in the Tactile Modality," Department of Electrical Engineering and Computer Science, Dated: May 23, 2001, pp. 1-118.

"Emoti-Chair lets your feel the sound," The London Free Press, Date Accessed: Nov. 4, 2022, p. 1.

(56) References Cited

OTHER PUBLICATIONS

"Upgrade your sleep. Downgrade your stress," Apollo, Date Access: Nov. 4, 2022, pp. 1-14 <https://apolloneuro.com/>.
"Inspiring Innovation," Sensel, Year: 2022, pp. 1-18, <https://sensel.com/>.

* cited by examiner

AUTOMATED GENERATION OF HAPTIC EFFECTS BASED ON HAPTICS DATA

CROSS-REFERENCE TO RELATED APPLICATIONS

This application claims benefit of and priority to U.S. Provisional Patent Application Ser. No. 63/231,142 filed Aug. 9, 2021, which is herein incorporated by reference in its entirety for all purposes.

INTRODUCTION

The present disclosure generally relates to haptic technology. More specifically, embodiments disclosed herein provide techniques for generating haptic effects at a computing device based on haptic data for media content.

Haptics has added a new dimension to modern entertainment and media applications, enhancing user interaction and immersion. Recent haptic technologies generally involve supplementing audio content with dynamic and engaging haptic effects that can be perceived by a user's body. The haptic effects are generally based on haptic signals that are generated by converting one or more attributes of the audio signals (e.g., pitch, frequency) into one or more corresponding attributes of haptic signals (e.g., amplitude, frequency). For example, some haptic generation techniques can convert attributes of the audio (e.g., pitch, frequency, etc.) to corresponding attributes (e.g., amplitude of vibration, frequency of vibration, etc.) of haptics. In some cases, generating haptics in this manner can lead to a poor user experience during streaming of media content. For example, the generated haptic effect may not be the correct haptic effect for the particular context of a scene (e.g., haptic effect is generated for an event which is heard in the audio content but not visible in the video content), the generated haptic effects can overwhelm the user, etc.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Streaming services (e.g., video streams, audio streams, or multimedia streams) have become increasingly common and desired by a wide variety of users. Streaming content enables users to receive the multimedia they desire at the time they desire/need it, rather than downloading it ahead of time. That is, rather than force users to wait long periods of time for large downloads (e.g., an entire movie), which also forces users to store large amounts of data, streaming enables the user to fetch smaller segments of a larger video on an as-needed basis (e.g., just before the segment begins).

Embodiments of the present disclosure provide techniques for generating and distributing haptic data (also referred to as haptic information, haptics data, or haptics information) for media content, such as streaming content. The streaming content can include video, audio, or a combination of video and audio. In certain embodiments, a haptic component generates haptic data and transmits the haptic data to a client device(s). The client device(s) can use the haptic data to generate haptic effects (e.g., haptic vibrations) (also referred to as haptic signals, haptic responses, haptics, etc.) while the media content is presented (e.g., streamed, played, etc.) on the client device(s). The media content can include live media content, pre-recorded media content, or combinations of live media content and pre-recorded media content.

Figure 1:
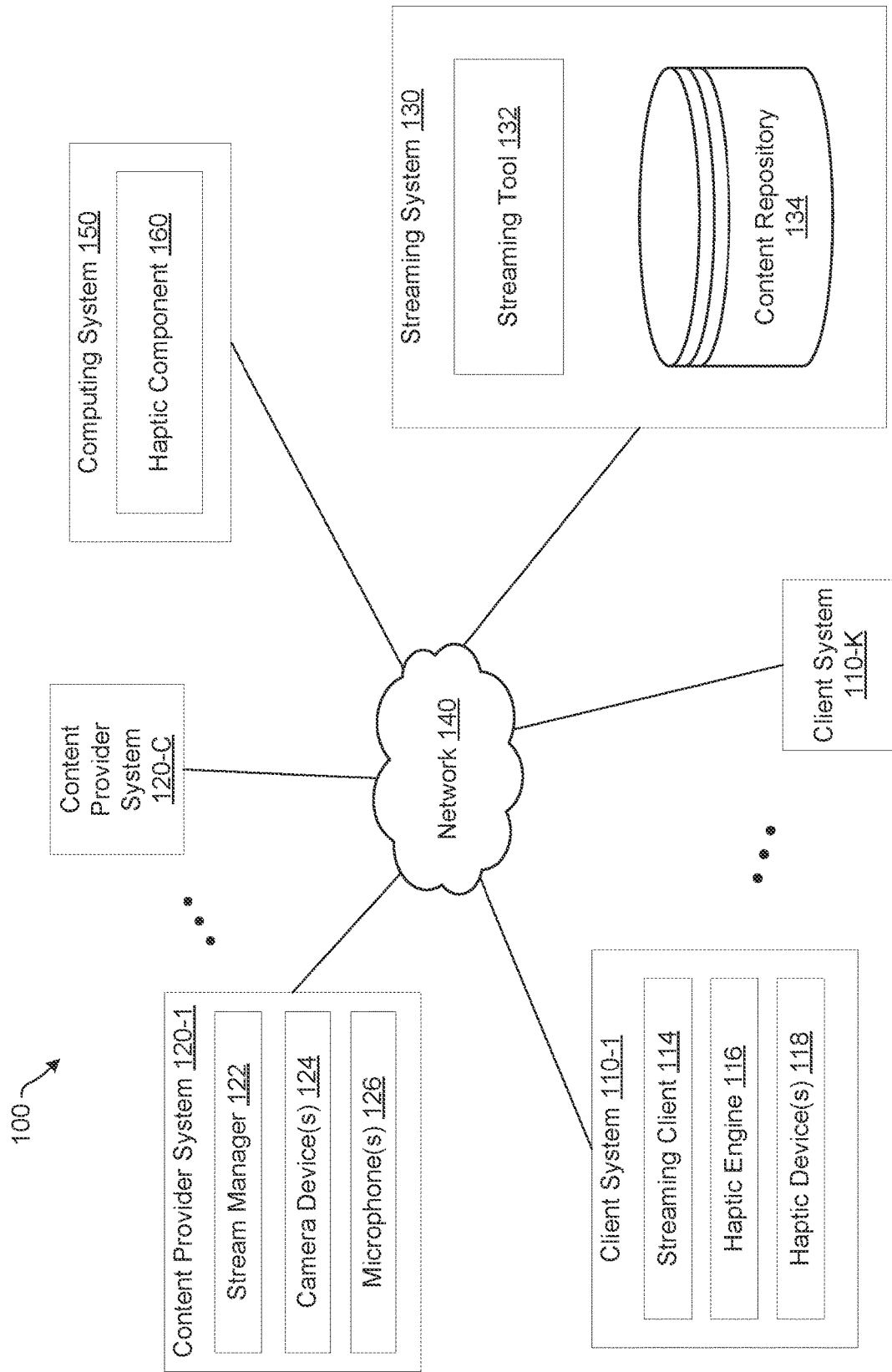
FIG. 1 illustrates an example computing environment for streaming media content over a network, according to embodiments of the present disclosure.

FIG. 1 illustrates an example computing environment 100 for streaming media content over a network, according to one embodiment. As shown, the computing environment 100 includes client systems 110 1-K, content provider systems 120 1-C, a streaming system 130, and a computing system 150, each interconnected via the network 140. The network 140 is generally representative of a variety of communication networks. For example, the network 140 may be a wide area network (WAN), local area network (LAN), wireless LAN (WLAN), personal area network (PAN), a cellular network, decentralized network, mesh network, distributed network, quantum/entangled network, etc. In a particular embodiment, the network 140 is the Internet.

Client systems 110 1-K are representative of a variety of computing systems (or client devices), including, but not limited to, a desktop computer, laptop computer, mobile computer (e.g., a tablet or a smartphone), digital media player, video game system, smart television, and wearable device (e.g., bracelet, watch, vest, augmented reality (AR) helmet, AR glasses, gloves, headset, seat cushion, etc.). The content provider systems 120 1-C, streaming system 130, and computing system 150 are representative of a variety of computing systems, including but not limited to, a desktop computer, server, laptop computer, etc. In some embodiments, one or more components of the streaming system 130 may be distributed across one or more computing systems in a cloud network. Similarly, in some embodiments, one or more components of the computing system 150 may be distributed across one or more computing systems in a cloud network.

The content provider system 120 (e.g., content provider system 120-1) is generally configured to send media content to the streaming system 130, and the streaming system 130 is configured to make the media content accessible to one or more users (e.g., via client systems 110). The media content can include audio content, video content, or combinations of audio content and video content. The content provider system 120 includes a stream manager 122, camera device(s) 124, and microphone(s) 126. In one embodiment, a content provider can use the camera device(s) 124 to record video, audio, or a combination of video and audio for an event in real-time. In another embodiment, a content provider can use the microphone(s) 126 to record audio for an event in real-time.

The stream manager 122 provides an interface for the content provider to access the streaming system 130. In one embodiment, the stream manager 122 can capture recorded media content from the camera device(s) 124, microphone(s) 126, or a combination of the camera device(s) 124 and microphone(s) 126. The stream manager 122 can send the recorded media content in real-time (e.g., as the media content is being recorded) to the streaming system 130. In one embodiment, the stream manager 122 can transcode the recorded media content into one or more compressed media content files using one or more codecs (e.g., H.264, High Efficiency Video Coding (HEVC) or H.265, free lossless audio codec (FLAC), etc.), and send the compressed media content to the streaming system 130.

The streaming system 130 includes a streaming tool 132 and a media content repository 134. As noted, in some embodiments, the streaming system 130 may be located in a cloud environment. The streaming tool 132 can receive recorded media content (e.g., audio, video, or combinations thereof) sent by the content provider system 120, transcode the media content into multiple streams (e.g., video streams, audio streams, or combinations of audio and video streams), and distribute the streams to the client system 110.

In one embodiment, the streaming tool 132 can distribute the streams to geographically disparate nodes of a content delivery network (CDN) for on-demand access by users of the streaming system 130. In one example, a user may access the streaming system 130 via a streaming client 114 on the client system 110. The streaming client 114 may be implemented using various technologies, including, for example, a web browser, application, etc. The streaming client 114 may enable the user to search for a live media content item (e.g., live video event, live audio event, etc.), an archived media content item (e.g., an archived video event, an archived audio event (or podcast)), or a particular content provider from the content repository 134 within the streaming system 130. In response to a request for a media content item, the streaming tool 132 may stream the media content item to the user, via the streaming client 114. In embodiments where the media content is a live video event being recorded (e.g., sporting event, concert, theatrical play, talk-show, self-user video, live video gaming, etc.), the streaming tool 132 may stream audio and video content of the live video event to the user (e.g., via streaming client 114) in real-time (e.g., as the live event is being recorded). In embodiments where the media content is an archived video event, the streaming tool 132 may stream audio and video content of the archived video event to the user (e.g., via streaming client 114).

In some embodiments, the streaming system 130 may allow a user to download media content (e.g., from the content repository 134) to another computing system (e.g., client system 110). In these embodiments, the user can access the downloaded media content for later consumption, e.g., via the streaming client 114. In this manner, the user may still be able to access media content in situations where the user is unable to access the streaming system 130 (e.g., the network connection may be unavailable, the quality of network connection may be insufficient to support streaming, etc.).

As shown, the computing system 150 includes a haptic component 160, which is generally configured to perform one or more techniques presented herein for generating and distributing (or transmitting) haptic data for media content. In one embodiment, the haptic component 160 is configured to use machine learning (ML) techniques to generate haptic data based on audio content, video content, or combinations of audio and video content. The haptic component 160 can include software, hardware, or combinations thereof. Note that while the haptic component 160 is shown within the computing system 150, in other embodiments, at least some or all of the functionality of the haptic component 160 can be implemented elsewhere (e.g., client system 110, content provider system 120, streaming system 130, distributed across a cloud network, etc.).

In some embodiments, the haptic component 160 receives the media content as an input and uses ML techniques to generate haptic data corresponding to one or more portions of the media content. In an embodiment, the media content is received by the haptic component 160 in real-time (e.g., as it is being recorded by the content provider system 120). In an embodiment, the media content is archived and retrieved by the haptic component 160 from a storage location (e.g., database). In an embodiment, the media content is received by the haptic component 160 from the streaming system 130. In some embodiments described in more detail below, once haptic data for the media content is generated, the haptic component 160 can generate one or more haptic files for the particular media content. The haptic files may be associated with a type of client device (e.g., device family), user profile(s) within a client device, environmental conditions (e.g., location, time of day, weather conditions, level of user engagement, etc.), media type (e.g., audio, video, etc.), user attributes, device capabilities, connection quality (e.g., bitrate, bandwidth, etc.), and the like.

Once haptic data for the media content is generated, the haptic component 160 can send the haptic data to the streaming system 130. As described in more detail below, the streaming system 130 may make the haptic data available to the client system 110. In embodiments where the user is streaming media content from the streaming system 130, the streaming system 130 may transmit the haptic data as part of the streamed media content to the client system 110. In embodiments where the user has downloaded media content from the streaming system 130 (e.g., for later consumption), the streaming system 130 may make the haptic data available to the user as part of the downloaded media content (e.g., the haptic data may be downloaded along with the media content). In this manner, the user can still experience generated haptic effects (based on the haptic data), while consuming the media content, for example, in situations where a network connection is unavailable, the quality of network connection is insufficient to support streaming, etc.

Further, in some embodiments, the streaming system 130 may transmit one or more haptic event triggers (corresponding to the haptic data), which allow the user to request the corresponding haptic data from the streaming system 130 when the haptic event triggers are detected. In this manner, the streaming system 130 may be able to provide different (or updated) haptic data for media content over time, as opposed to providing predefined haptic data for media content.

As shown, the client system 110 includes a haptic engine 116, which is generally configured to trigger (or activate) the haptic device(s) 118, based on the haptic data. The haptic device(s) 118 may be located on the client system 110 or external to the client system 110. The haptic device(s) 118 can include one or more physical actuators, such as piezoelectric actuator(s), electromagnetic actuator(s), etc., speakers, touchscreen, etc. The haptic engine 116 can control one or more properties (or parameters) of the haptic device(s) 118, based on the haptic data, to generate one or more haptic responses or effects or patterns. The properties of the haptic device(s) 118 can include, for example, duration, amplitude envelopes (e.g., fade-ins or fade-outs), frequencies, start times, intensity, etc.

The haptic engine 116 may use any one of, or combination of, the haptic device(s) 118 to generate a haptic response that can be felt by the user (of the client system 110) during playback of the media content (e.g., via the streaming client 114). In one embodiment, the haptic engine 116 can activate an actuator to generate the haptic response, which may be a mechanical vibration or pulse in the client system 110. In an embodiment, the haptic engine 116 can activate a speaker to generate the haptic response. For example, the speaker may generate a low frequency audio signal that causes a mechanical vibration or pulsing in the client system 110. In an embodiment, the haptic engine 116 can use a touchscreen to generate the haptic response. For example, the touchscreen may include one or more layers (e.g., conductive layers, insulating layers, etc.), and an electrical signal(s) may be communicated through the layer(s) to cause the user to experience a sensation when touching the touchscreen. In some embodiments, the haptic engine 116 may enable a user to control one or more parameters of the generated haptic responses. For example, the haptic engine 116 may include a user interface (e.g., graphical user interface (GUI)) that can be used to accept user input for controlling parameters of the generated haptic responses. The parameter(s) can include, for example, selection parameters, mixing parameters, intensity parameters, etc. In some embodiments, the haptic engine 116 may automatically control parameters of the generated haptic responses based at least in part on one or more environmental conditions (e.g., time of day, weather conditions), gyroscope data, user gestures, etc.

Note that FIG. 1 illustrates a reference example of a computing environment 100 for streaming media content and that the techniques described herein can be implemented in other computing environments. For example, while the computing environment 100 is shown with a certain number of client systems 110 and a certain number of content provider systems 120, the computing environment 100 can include any number client systems 110 and any number of content provider systems 120. For example, the computing environment 100 may provide a haptics experience for the user across multiple client systems 110. For instance, a user may be able to watch media content on a first client system 110-1 (e.g., television) and feel haptic effects on a second client system 110-2 (e.g., smartphone), where the first client system 110-1 and second client system 110-2 are synced in real-time. This type of haptics experience can increase accessibility for users with visual/auditory impairment.

In some cases, embodiments may use groupwatch technology in order to sync the haptics across the multiple client systems. In some cases, embodiments may use a communication protocol (e.g., WiFi, Bluetooth, etc.) to sync the haptics across the multiple client systems. For example, in one embodiment, the first client system 110-1 (e.g., television) can send a signal over a communication protocol (e.g., WiFi, Bluetooth, etc.) to a streaming application on the second client system 110-2 (e.g., smartphone). The second client system 110-2 can sync the user's login via the first client system 110-1 to the streaming application. A screen may then load on the second client system 110-2 to confirm a haptics display for the media content. The user can then turn a screen on the second client system 110-2 off and haptics will still be generated on the second client system 110-2 for the media content. The first client system 110-1 can trigger streaming haptic data from the streaming system (or other location) to the second client system 110-2 and mediate the sync between the first client system 110-1 and the second client system 110-2.

Additionally, while FIG. 1 depicts the haptic component 160 being included within a computing system 150, in certain embodiments, the haptic component 160 may be located elsewhere. For example, the haptic component 160 may be located within the client system 110 (e.g., executed at the client level). In another example, the haptic component 160 may be located within a content provider system 120 or within a streaming system 130 (e.g., executed at a service level). Further, while embodiments provided herein describe generating and distributing haptics data for media content, note that embodiments described herein can also be used for generating and distributing haptics data for other types of streamed data content, including, for example, electrocardiogram (EKG) data, electroencephalography (EEG) data, etc.

Figure 2:
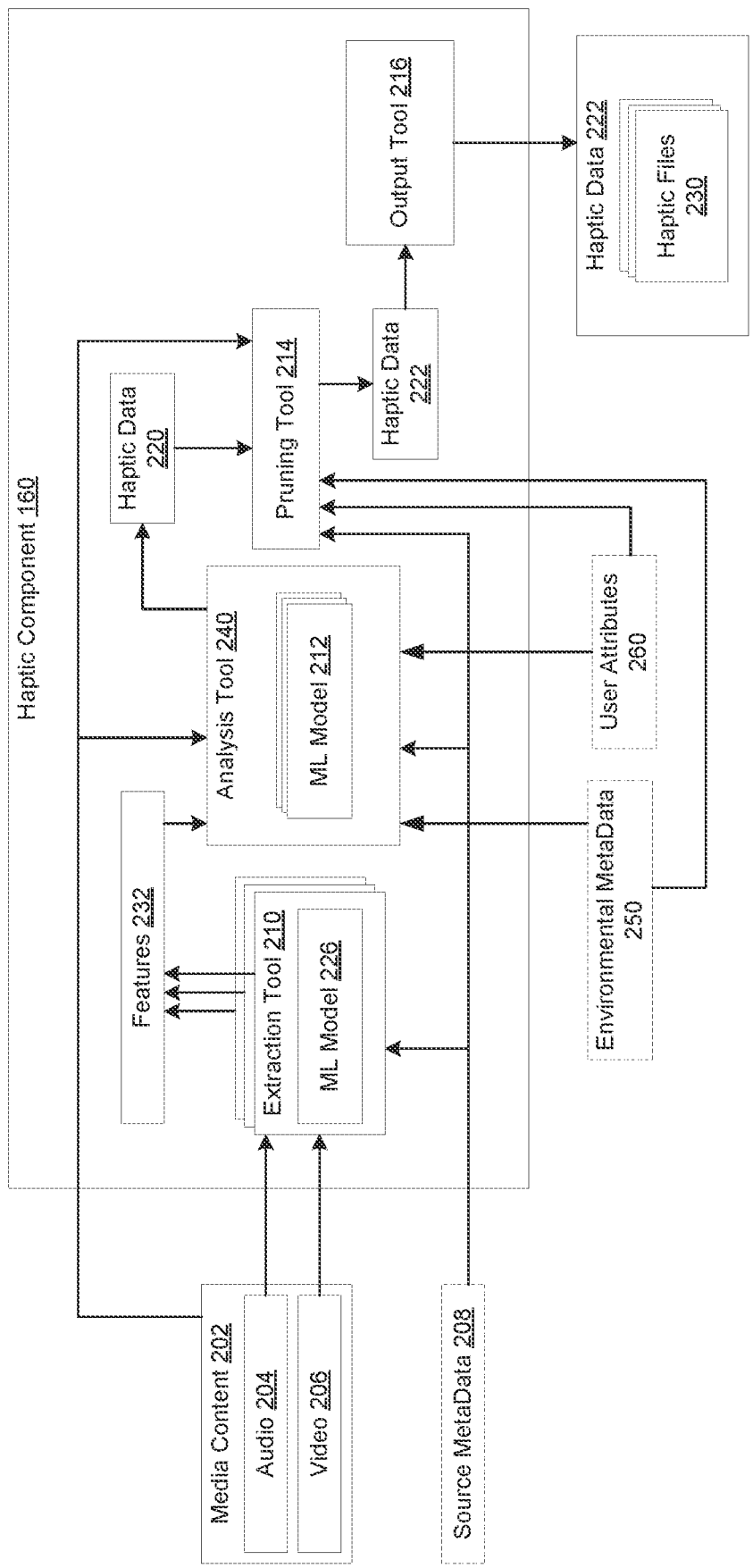
FIG. 2 further illustrates components of the computing environment depicted in FIG. 1, according to embodiments of the present disclosure.

FIG. 2 further illustrates components of the haptic component 160, described relative to FIG. 1, according to one embodiment. As shown in FIG. 2, the haptic component 160 includes one or more extraction tools 210, an analysis tool 240, a pruning tool 214, and an output tool 216, each of which can include software, hardware, or combinations of software and hardware.

In the depicted embodiment, the extraction tool 210 receives media content 202 (including audio 204, video 206, or audio 204 and video 206) and determines (or extracts) one or more features 232 of the media content 202, based on analysis of the media content 202. The extraction tool 210 can extract features 232 of the audio 204, features 232 of the video 206, or features 232 of the audio 204 and video 206. In one reference example, the features 232 can include segmented audio signals. To obtain the segmented audio signals, the extraction tool 210 can analyze video frames data within the video 206 and segment visual effects within the video 206, identify conversational voice, identify the soundtrack, etc., based on the analysis of the video frames data. In some cases, the extraction tool 210 can determine how many people are involved in speaking and who is speaking at particular points in time from the video frames, and use this information to separate (or segment) the audio signals.

In one reference example, the features 232 can include one or more image/video frame three-dimensional (3D) data values, examples of which can include, Red, Green, Blue (RGB) data values, contrast, exposure, etc. In one reference example, the features 232 can include one or more image/video frame two-dimensional (2D) data values, examples of which can include grayscale values. In one reference example, the features 232 can include one or more "flashes" in a scene.

In some embodiments, the extraction tool 210 uses one or more ML techniques to determine one or more of the features 232. Here, for example, the extraction tool 210 includes a ML model 226. In one embodiment, the extraction tool 210 uses the ML model 226 to determine (or detect) different types of motions that are going on in different scenes of the video 206. For example, assuming the video 206 includes a lightsaber duel scene, in a specific video segment, the extraction tool 210 (using the ML model 226) can detect and generate a list of "motions," such as "person falling," "swinging a long object," etc.

To train the ML model 226, image segmentation may be performed to isolate different objects in one or more video frames (different from the video 206). A correlation is then made of the motion of segmented/isolated objects between consecutive video frames and a determination is made of the motion of the isolated objects (e.g., "fell," "swung," etc.). The ML model 226 may then be trained on the data indicating correlations of motions of segmented/isolated objects between consecutive video frames and data indicating a motion of the isolated objects. Once trained, the extraction tool 210 can use the ML model 226 to detect the "motion type" of different objects, and include the "motion type" as one of the features 232.

In one embodiment, the extraction tool 210 can determine, for each "motion type," one or more properties (e.g., spatial directions, acceleration, velocity, etc.) of the motion type. As an example, the extraction tool 210 can calculate the spatial movement of a "motion type" from (continuous) video frames. Continuing with the above reference example of a lightsaber duel scene, in a specific segment, the extraction tool 210 can calculate the spatial movement of a specific lightsaber as "(x:−23, y:−52, z: 52, time: 0.00)→(x:−23, y:−22, z: 52, time: 0.01)→(x: 52, y:−13, z: 22, time: 0:02)". The extraction tool 210 may assign values for the properties of each "motion type" detected in a video segment, and include the values in the features 232. As described in more detail below, the data indicating "motion types" and "motion type's spatial movement" can be used to determine which "motion types" should be present in the haptic data generated for the media content 202.

In one embodiment, the extraction tool 210 can perform sentiment analysis of the video frames in the video 206 to determine a sentiment (or context) of each scene within the video frames. For example, the extraction tool 210 can perform visual sentiment analysis on the video frames (e.g., images) using ML techniques, which can include, for example, Support Vector Machine (SVM), neural networks, Bayesian network, maximum entropy, etc. The extraction tool 210 can include the scenes' sentiments (determined from the visual sentiment analysis) in the features 232. As described below, in some embodiments, the scenes' sentiments may be used to adjust at least one of a number of haptics or an intensity of haptics, e.g., based on a table that maps sentiment to one or more properties (e.g., attack, intensity, amplitude, etc.) of the haptic effect.

In some embodiments, the extraction tool 210 can also receive source metadata 208 and use the source metadata 208 as an additional input to determine one or more of the features 232. The source metadata 208 generally includes information regarding the scene (or setting) of the video 206. Assuming the video 206 includes one or more video frames of a sports event, the source metadata 208 can include sports data (e.g., from a sports data product such as Statcast from Major League Baseball or Next Gen Stats from the National Football League) regarding different events that take place during the sports event. The sports data can be used for purposes of player and ball tracking. For instance, for a baseball game, the sports data can indicate when a "hit" occurred, when a "home run" occurred, when a "foul ball" occurred, a type of pitch, etc. In another example, for a soccer game, the sports data can indicate when a shot on goal occurred, when a goal was scored, and so on.

In another example, the source metadata 208 can include information from one or more hardware sensors (e.g., cameras, ultrasonic sensors, etc.). The hardware sensors can be used to detect events or actions in a scene. For example, an ultrasonic sensor can be placed on a basketball hoop to detect when a basket is made.

In another example, the source metadata 208 can include contextual information associated with the media content 202. For example, the source metadata 208 can indicate the sentiment (or context) of different portions of the media content 202 (e.g., the sentiment of one or more scenes within the video 206, the sentiment of one or more audio segments of the audio 204, etc.). In another example, the source metadata 208 can include 3D/volumetric data or information. For example, volumetric audio can be captured through microphone arrays for capturing on field sports audio.

In some embodiments, the extraction tool 210 uses the source metadata 208 to identify events that may have not been captured in the audio 204 or the video 206. For example, assuming the audio 204 does not include sound of a baseball making contact with a bat, the extraction tool 210 can determine when the baseball made contact with the bat from the source metadata 208, from the video 206, or from a combination of the source metadata 208 and the video 206. In another example, assuming the audio 204 does not indicate the type of baseball pitch (e.g., fastball, curveball, etc.), the extraction tool 210 can determine the type of baseball pitch from the source metadata 208, from the video 206, or from a combination of the source metadata 208 and the video 206. In yet another example, assuming the source metadata 208 includes 3D/volumetric data or information, the volumetric data can be used to trigger advanced spatial/multichannel haptics. In another example, the volumetric data can track the motion of the ball and the trajectory can be mapped to haptic amplitude, such that as a ball is hit, the initial haptics may be stronger but decrease as the ball moves further from the point of impact and decreases in its velocity height.

The analysis tool 240 includes one or more ML models 212, which are generally configured to generate haptic data 220 for the media content 202. In one embodiment, each ML model 212 may be used for a different type of media content 202. For example, a first ML model 212 may be used for movies, a second ML model 212 may be used for sporting events, a third ML model may be used for live news, etc. In another embodiment, each ML model 212 may be used for different genres of content. For example, a first ML model 212 may be used for action movies, a second ML model 212 may be used for baseball games, a third ML model 212 may be used for news from broadcaster A, and so on.

Here, the analysis tool 240 can use one or more of (or a combination of) the media content 202, features 232, source metadata 208, environmental metadata 250, and user attributes 260 as inputs to the ML model(s) 212 to generate the haptic data 220. The environmental metadata 250 may include information regarding one or more conditions in an environment in which the client system 110 is located. Examples of environmental metadata 250 can include, but is not limited to, sensor data from the client system 110 (e.g., gyroscope data, accelerometer data, electrical impedance, etc.), audio signals within the environment (detected by the client system), weather conditions, location of the client system 110, and the like. The user attributes 260 generally includes information associated with the user of the client system 110, including, for example, age of the user, height of the user, accessibility factors (e.g., whether the user has a visual/auditory impairment), etc. In some embodiments, the haptic data 220 includes haptic effects for different features 232 of the media content 202.

In some embodiments, the ML model(s) 212 map one or more of the features 232 of the media content 202 to different haptic effects, and includes an indication of the mapping(s) in the haptic data 220. For example, assuming the media content 202 is a film featuring a hero, the analysis tool 240 can map a video frame sequence of an object bouncing off of the hero's weapon to a particular haptic effect. In another example, assuming the media content 202 is a live sporting event, such as a baseball game, the analysis tool 240 can map a video frame sequence of a baseball hitting a bat to a particular haptic effect and can map another video frame sequence of a homerun to a different haptic effect.

The analysis tool 240 may access a database of predefined haptic effects for different types of events and may map a given feature 232 to one of the predefined haptic effects. In an embodiment, the analysis tool 240 can map different sounds within the media content 202 to the same haptic effect. Continuing with the example of a baseball game, the analysis tool 240 may determine, based on an analysis of the features 232, that a first set of audio signals during a first video segment correspond to a sound of a foul ball and that a second set of audio signals during a second video segment also correspond to the sound of a foul ball. In this example, the analysis tool 240 may map the first video segment and the second video segment to the same haptic effect associated with the sound of a foul ball.

In an embodiment, the analysis tool 240 can map the same sounds within the media content 202 to different haptic effects. Continuing with the example of a baseball game, the analysis tool 240 may determine, based on analysis of the features 232, that a first set of audio signals and a second set of audio signals have similar sound characteristics (e.g., pitch, frequency, etc.). The analysis tool 240 may further determine that the first set of audio signals correspond to a video segment of a homerun and the second set of audio signals correspond to a video segment of a foul ball. In this example, the analysis tool 240 can map the first set of audio signals to a first haptic effect associated with the sound of a homerun and the second set of audio signals to a second haptic effect associated with the sound of a foul ball. In some cases, the analysis tool 240 can receive sports data (which may include volumetric information) that indicates the velocity and trajectory of a tracked object. The analysis tool 240 can determine, based on the sports data, whether the tracked object is a foul ball, in play, caught ball, etc.

In some embodiments, the analysis tool 240 maps specific media elements (e.g., characters, settings, cardinal directions, etc.) to different haptic effects in order to create unique motifs for the different media elements. For example, the analysis tool 240 can map a first haptic effect to a first character in a movie, map a second haptic effect to a second character in the movie, and so on, and can include an indication of the different haptic effects in the haptic data 220. In this manner, the haptics component 160 can enhance the narrative utility of the media content 202.

In some embodiments, the analysis tool 240 determines a current level of user engagement with the client system 110 based on the environmental metadata 250, and generates haptic data 220 based in part on the current level of user engagement. For instance, the analysis tool 240 can determine whether the user is gripping the client system 110 (e.g., based on electrical impedance information from the touchscreen of the client system 110), sentiment of the user (e.g., based on facial scan of the user captured by the client system 110), heart rate (e.g., based on optical sensor of the client system 110), and the like. In a particular embodiment, the analysis tool 240 evaluates the environmental metadata 250 and the features 232 with a ML model 212 trained to maximize user engagement with the client system 110. For example, the analysis tool 240 may determine that pairing a high intensity haptic effect(s) with one or more video frames depicting an action scene in the video 206 maximizes user engagement in terms of heart rate, eye input, user grip, etc. In another example, the analysis tool 240 may determine that pairing transient haptic effects with one or more audio sequences in the audio 204 maximizes user engagement in terms of heart rate, eye input, user grip, etc.

In some embodiments, the analysis tool 240 generates haptic data 220 based at least in part on evaluating one or more user attributes 260 and the features 232 with the ML model 212. For example, the analysis tool 240 may generate a first set of haptic data 220 for users in a first age group, may generate a second set of haptic data 220 for users in a second age group, and so on. In another example, the analysis tool 240 may generate a first set of haptic data 220 for users that have a first type of accessibility factors (e.g., visual capability), may generate a second set of haptic data 220 for users have second a type of accessibility factors that (e.g., auditory capability), etc.

As noted above, in some embodiments, the source metadata 208 may include contextual information associated with the media content 202. In these embodiments, the analysis tool 240 can generate haptic data 220 based in part on the contextual information. Assume, for example, that the source metadata 208 indicates that a scene within an action movie has a "tense" moment. In this example, the analysis tool 240 can generate a haptic effect of a "heartbeat" to be played during the "tense" moment of the scene. In another example, the analysis tool 240 can generate a haptic sequence of morse code for a particular message during a dramatic moment within a scene during the action movie. In yet another example, the analysis tool 240 can generate a haptic sequence for a gun fight scene in which the intensity and frequency of the haptic effects increase during the gun fight scene.

In FIG. 2, the pruning tool 214 receives haptic data 220 and generates haptic data 222. The haptic data 222 includes a different set of haptic effects than the haptic data 222. In one example, the haptic data 222 may include a smaller set of haptic effects than haptic data 220. In another example, the haptic data 222 may include an adjusted (or modified or augmented) set of haptic effects than haptic data 220. In yet another example, the haptic data 222 may include a combination of a smaller set of haptic effects and an adjusted set of haptic effects than haptic data 220.

In some embodiments, the pruning tool 214 is configured to adjust one or more haptic effects of haptic data 220, based on analysis of one or more of the media content 202, the source metadata 208, the features 232, the environmental metadata 250, user attributes 260, and the haptic data 220. The pruning tool 214 may perform the analysis using a set of predefined rules or using ML techniques. The pruning tool

214 may adjust the one or more haptic effects by increasing (or adding) a number of haptic effects (relative to haptic data 220), removing a number of haptic effects (relative to haptic data 220), adjusting an intensity of one or more haptic effects (relative to haptic data 220), increasing a frequency of one or more haptic effects (relative to haptic data 220), decreasing a frequency of one or more haptic effects (relative to haptic data 220), changing a type of the haptic effect(s) (relative to haptic data 220) (e.g., changing from a transient haptic effect to a continuous haptic effect), or a combination thereof.

In one embodiment, the pruning tool 214 can at least one of remove certain haptic effects or reduce an intensity of certain haptic effects in order to avoid overwhelming a user with haptic effects during playback (e.g., streaming) of the media content 202, which may include various elements, voice, audio, animations, etc. For example, the pruning tool 214 may determine, based on user attributes 260, that a given user has a proclivity towards being overwhelmed by haptic effects during certain dialogue portions of media content 202 (e.g., when a character "X" is speaking during scenes of the video 206), and may generate haptic data 222 that includes at least one of (i) a reduced set of haptic effects than haptic data 220 or (ii) a set of haptic effects with reduced intensities compared to haptic data 220. In some embodiments, the set of haptic effects within haptic data 222 may further be adjusted during user playback on the client system 110, based on one or more user input. For example, based on user gestures detected during playback of the media content 202, the client system 110 may determine to at least one of: (i) further reduce one or more haptic effects within the haptic data 222 or (ii) further reduce an intensity of one or more haptic effects within the haptic data 222.

In another example, the pruning tool 214 may determine to selectively adjust one or more haptic effects of the haptic data 220, based on one or more environmental metadata 250, including, for example, time of day, weather conditions, gyroscope data, and other user input. For example, the pruning tool 214 can determine to reduce at least one of a number of haptic effects or an intensity of haptic effects to avoid overwhelming the user during certain times of the day, during certain weather conditions, and the like. Alternatively, the pruning tool 214 may determine to increase at least one of a number of haptic effects or an intensity of haptic effects to make the haptic effects more noticeable to the user during certain times of the day, during certain weather conditions, and the like. For example, the pruning tool 214 can modify a frequency of haptics to improve noticeability based on one or more environmental metadata 250, such as a low frequency audio sound (or rumble) being present in the user's environment. In such an example, the pruning tool 214 can shift the haptic frequencies so that they are more noticeable to the user in the presence of the low frequency audio sound.

In some embodiments, the pruning tool 214 may also consider accessibility factors in addition to the environmental metadata 250 when determining whether to selectively adjust one or more haptic effects of the haptic data 220. In one embodiment, the accessibility factors may be considered for users that have certain visual/auditory impairments. For example, the pruning tool 214 may determine, based on user attributes 260, that the user has a visual impairment in certain times of the day and may determine to increase at least one of a number of haptic effects or an intensity of haptic effects for the user in these times of the day. In another example, the pruning tool 214 may determine, based on user attributes 260, that the user has an auditory impairment and may allow more haptics, compared to the amount of haptics allowed for non-hearing impaired users.

In another embodiment, the accessibility factors may be considered for users that do not have certain visual/auditory impairments. For example, the pruning tool 214 may determine to increase at least one of a number of haptic effects or an intensity of haptic effects upon determining that there are environmental conditions that would cause a lack of visual clarity of the media content 202, reduce (or hamper) the volume of the media content 202, etc.

In some embodiments, the pruning tool 214 may generate haptic data 222 by adjusting one or more haptic effects of the haptic data 220, based on different portions (or stems) of the media content 202. For example, the pruning tool 214 may generate haptic data 222 which includes a first set of haptic effects that are more pronounced than the audio 204 in a first set of scenes of the media content 202 and a second set of haptic effects that are less pronounced than the audio 204 in a second set of scenes of the media content 202.

In one embodiment, the pruning tool 214 may determine the portions of the media content 202 in which to adapt corresponding haptic effects, based on the source metadata 208. For example, the source metadata 208 may include timestamps indicating when dialogue occurs within the media content 202. In such an example, the pruning tool 214 can compare the haptic metadata timestamps (within haptic data 220) against the dialogue timestamps. The pruning tool 214 may at least one of (i) reduce the intensity of haptic effects or (ii) remove haptic effects when there are overlapping timestamps between the dialogue timestamps and haptic metadata timestamps. In another example, the source metadata 208 can indicate one or more types of media within the media content 202 (e.g., voice, background music, sound effects, etc.). In such an example, the pruning tool 214 may at least one of (i) reduce the intensity of haptic effects or (ii) remove haptic effects during playback of one or more types of media within the media content 202 (e.g., haptic effects may be reduced during playback of background music or other sound effects within the media content 202).

In some embodiments, the pruning tool 214 is configured to include haptic effects for certain "motion types" within the haptic data 222. In some embodiments, the pruning tool 214 is configured to include haptic effects for certain properties (e.g., spatial directions, velocity, etc.) of "motion types."

The output tool 216 receives the haptic data 222 and is configured to generate and transmit a set of haptic files 230. In one embodiment, the haptic files 230 are associated with different types of devices (e.g., client system 110). For example, a first haptic file(s) 230 may be associated with a first type of device, a second haptic file(s) 230 may be associated with a second type of device, and so on. In one embodiment, the haptic files 230 are associated with different device capabilities. In one embodiment, the haptic files 230 are associated with different network connection speeds or encoding qualities for streaming (e.g., a first haptic file is associated with a first bitrate, a second haptic file is associated with a second bitrate, etc.).

In one embodiment, the haptic data 222, including the haptic files 230, may be sent to the streaming system 130, which can make the haptic files 230 available to the client system 110 during playback of the media content 202. In one embodiment, the haptic data 222 can be generated by the client system 110.

In this manner, embodiments allow for haptic data to be generated from audio, video frames, or a combination of audio and video frames. Embodiments herein can generate haptic data for live media content, pre-recorded media content, or a combination of live media content and pre-recorded media content. The live media content, for example, can include live sports, live news, live award shows, etc. In the case of live media content, the haptic data 222 can be generated in real-time (e.g., as the media content is being recorded). In some embodiments, the haptic component 160 can automate the identification of haptic patterns, based on a pre-existing content library. For example, the haptic component can run ML analysis tools across various video and audio content in the catalog library. The catalog library can include visual effects, soundtracks, sound effects, visual geometries, color, etc.

In the case of pre-recorded media content, the haptic data 222 can be generated at any point during a production pipeline (e.g., pre-production, production, or post-production) used for producing the media content. In one embodiment, for example, a video editor can be used to generate an extensible markup language (XML) file containing time placement and haptic patterns for specific events. During the production phase, this XML can be exported and used to generate haptic effects. In another example, during pre-production, haptic effects can be written into a script for a movie. In this case, one or more haptic libraries can be pre-built based off the script, and sound can apply automated haptics to the final version of the movie. In another example, visual data and metadata can be captured by the source cameras/microphones (e.g., sensors) during the production process. This information can then be interpreted by the analysis tools to generate haptic data.

Note that FIG. 2 illustrates a reference example of a haptic component 160 and that, in other embodiments, the haptic component 160 may have a different configuration or a different number of components consistent with the functionality described herein. In some embodiments, the operations of the haptic component 160 are distributed across one or more computing systems. For example, the extraction tool 210, the analysis tool 240, the pruning tool 214, and the output tool 216 may be implemented by one or more computing systems. In a particular embodiment, at least one of the extraction tool 210 or the analysis tool 240 is implemented by a first computing system (e.g., computing system 150, streaming system 130, or content provider system 120) and at least one of the pruning tool 214 or the output tool 216 is implemented by a second computing system (e.g., client system 110 or streaming system 130).

Figure 3:
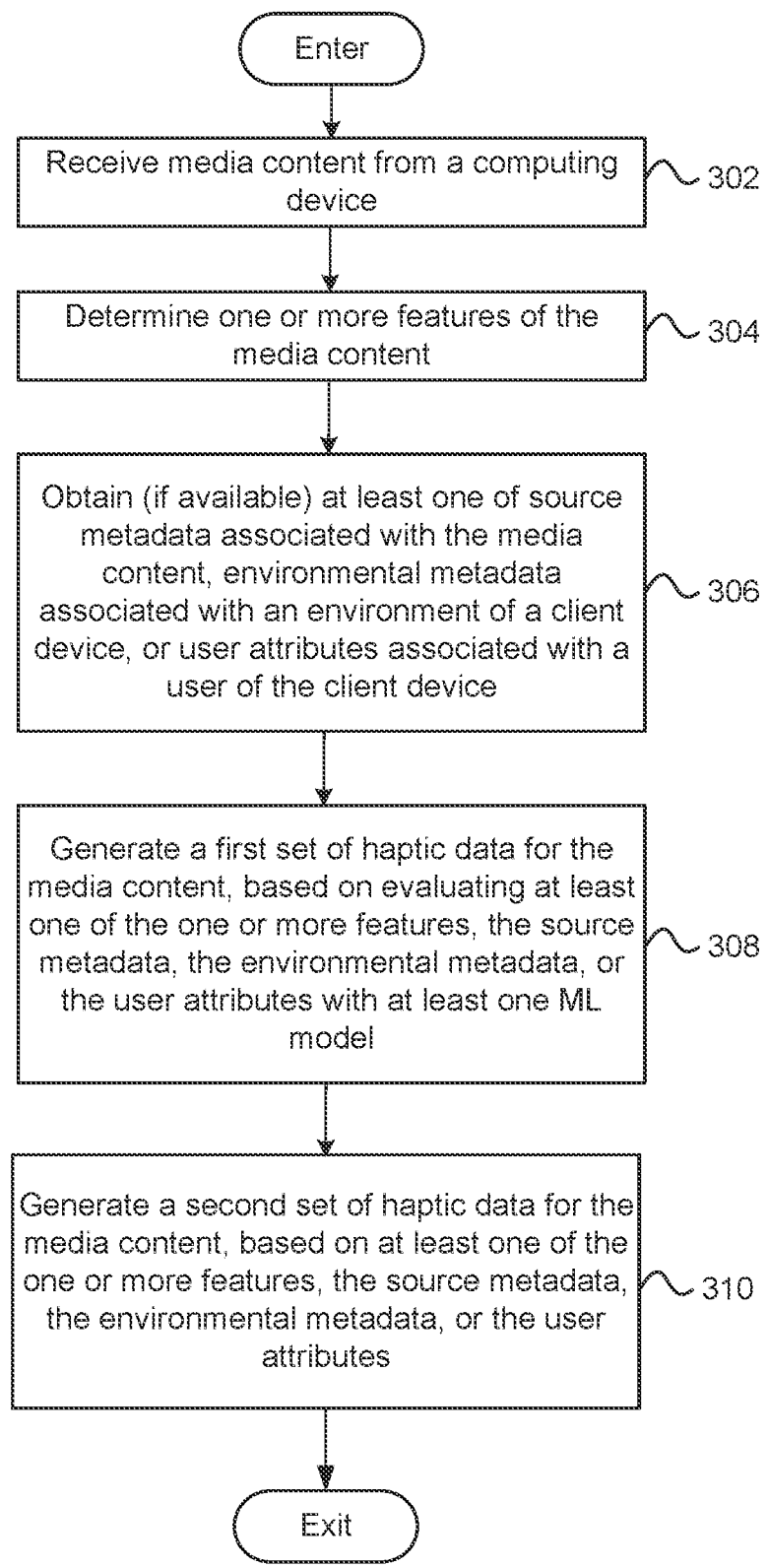
FIG. 3 is a flowchart of a method for generating haptic data for media content, according to embodiments of the present disclosure.

FIG. 3 is a flowchart of a method 300 for generating haptic data for media content, according to one embodiment. The method 300 may be performed by one or more components of the computing environment 100. In one particular embodiment, the method 300 is performed by a haptic component (e.g., haptic component 160).

Method 300 enters at block 302, where the haptic component receives media content (e.g., media content 202) from a computing device (e.g., content provider system 120). The media content includes at least one of audio content (e.g., audio content 204) or video content (e.g., video content 206).

At block 304, the haptic component determines one or more features (e.g., features 232) of the media content. In one embodiment, the haptic component can determine the one or more features, based on evaluating at least one of the media content or source metadata associated with the media content (e.g., source metadata 208) with a ML model (e.g., ML model 226).

At block 306, the haptic component obtains (if available) at least one of the source metadata associated with the media content, environmental metadata (e.g., environmental metadata 250) associated with an environment of a client device (e.g., client system 110), or user attributes associated with a user of the client device (e.g., user attributes 260).

At block 308, the haptic component generates a first set of haptic data (e.g., haptic data 220) for the media content, based on evaluating at least one of the one or more features, the source metadata, the environmental metadata, or the user attributes with at least one ML model (e.g., ML model 212).

At block 310, the haptic component generates a second set of haptic data (e.g., haptic data 222) for the media content, based on at least one of the one or more features, the source metadata, the environmental metadata, or the user attributes. The second set of haptic data is different from the first set of haptic data. In one embodiment, the second set of haptic data includes a smaller set of haptic features than the first set of haptic data. In another embodiment, the second set of haptic data includes a modified set of haptic features than the first set of haptic data. In another embodiment, the second set of haptic data includes a combination of a smaller set of haptic features and a modified set of haptic features than the first set of haptic data. The method 300 may then exit.

Referring back to FIG. 1, the streaming system 130 may receive the haptic data 222 and may distribute (or transmit) the haptic data 222 to one or more client systems 110. In one embodiment, the streaming system 130 may sync the haptic data 222 with the video feed before it is streamed to the client system 110. In an embodiment, the streaming system 130 may integrate the haptic data 222 in a transport stream used for the audio and video. In an embodiment, the streaming system 130 may integrate the haptic data 222 in a manifest file. For live content, the haptic data 222 may be sent in a similar manner as video text tracks (VTT) format. That is, the haptic data 222 can be delivered in a similar manner as an audio track, subtitle track, or language track.

In one embodiment, the streaming system 130 delivers segmented haptic data manifests as a sidecar to the client system 110. For example, timed haptic segmented manifests can be delivered as sidecar to video manifests. The segmented manifests can then be used for video playback. In some cases, the streaming system 130 may communicate with the client system 110 to determine whether to increase compute power/instances in order to speed up haptic data processing and delivery. For example, the client system 110 can send signals to the streaming system 130 and the streaming system 130 can determine which compute source to invest more or less resources in.

Figure 4:
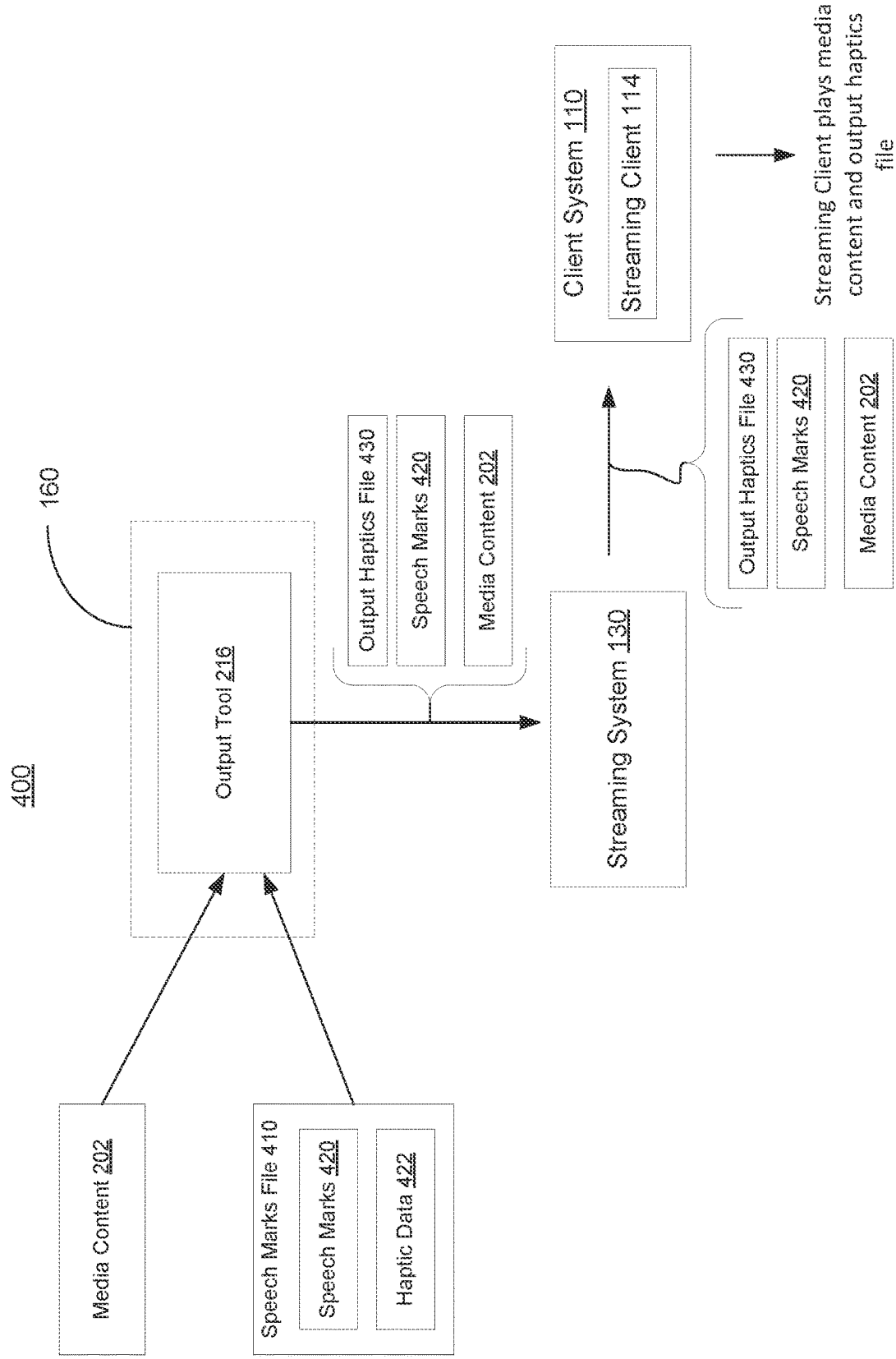
FIG. 4 illustrates an example workflow for haptics data transmission, according to embodiments of the present disclosure.

FIG. 4 illustrates an example workflow 400 for haptics data transmission (or haptics data distribution) to a client system, according to one embodiment. In the depicted embodiment, the output tool 216 (of the haptic component 160) receives media content 202 and a speech marks file 410. In one embodiment, the speech marks file 410 and the media content 202 may be used to drive an animation component (e.g., robot, virtual character, etc.) within the media content 202. For example, the speech marks file 410 generally includes a timestamped series of metadata describing at least one of speech, animations (e.g., mouth shapes, such as visemes), or emotional states (e.g., "emotion_happy," "emotion_sad", "emotion_excited," etc.). During playback of the media content 202, the user may view the animation component performing the defined behavior at each timestamp in the speech marks file 410.

In some embodiments, the speech marks file 410 delivers haptic data 422 that is generated using one or more techniques described herein to the client system 110. The haptic data 422 is an example representation of haptic data 220 or haptic data 222 described with respect to FIG. 2. Here, one or more haptic event tags (or keywords) (associated with haptic data 422) can be inserted into the timestamped series of metadata within the speech marks file 410. In such embodiments, the resulting speech marks file 410 includes a timestamped series of metadata describing at least one of speech, animations, emotional states, or haptic event tags (or keywords). The metadata (including the haptic event tags) in the speech marks file 410 may be based on synthesis markup language (SSML) format. An exemplary speech marks file 410 may include the following:

{"time": 0, "type": "sentence", "start": 114, "end" 124, "value": "Wow Keith!"} {"time": 125, "type": "ssml", "start": 8, "end": 36, "value": "EMOTION_HAPPY"} {"time": 125, "type": "ssml", "start": 37, "end": 61, "value": "ANIM_JUMP"} {"time": 125, "type": "ssml", "start": 62, "end": 90, "value": "HAPTIC_WHOOSH"} {"time": 125, "type": "word", "start": 114, "end": 117, "value": "Wow"} {"time": 125, "type": "viseme", "value": "u"} {"time": 875, "type": "ssml", "start": 135, "end": 161, "value": "HAPTIC_BANG"} where "HAPTIC_WHOOSH" corresponds to a continuous haptic effect (e.g., a swelling or subsiding vibration) and "HAPTIC_BANG" corresponds to a transient haptic effect (e.g., one or more bump vibrations). An example of SSML that can be used to generate the exemplary speech marks file 410 is shown below:

```
<speak>
<mark name="EMOTION_HAPPY"/>
<mark name="ANIM_JUMP"/>
<mark name="HAPTIC_WHOOSH"/>
<prosody volume="loud">Wow Keith!</prosody>
<mark name="HAPTIC_BANG"/>
<prosody rate="150%">Hehh Hehh,</prosody>
</speak>
```

In some embodiments, each haptic event in the speech marks file 410 corresponds to a set of haptic effects that will be executed on the client system 110 at the respective timestamp. For example, each haptic event may be mapped to data to control one or more of haptic device(s) 118 (on a client system 110) that will generate the set of haptic effects matching the haptic event in the speech marks file 410. In one embodiment, the mapping of each haptic event to a corresponding set of haptic effects is based on key-value dictionary pairings. That is, each haptic event may correspond to a predefined set of haptic effects (or haptic pattern), based on a particular key-value dictionary pairing.

In another embodiment, the mapping of each haptic event to a corresponding set of haptic effects is determined using ML techniques. In this embodiment, the haptic event(s) within the speech marks file 410 may have the following format: {Haptic Mark: start "whooshing" at timestamp "X" with emotion "Y" and intensity "Z"}. For example, a ML model can process at least one or more of environmental metadata 250 and user attributes 260 to determine the particular haptic pattern to use for "whooshing" at timestamp "X". In some cases, the ML model may be trained on metadata for a set of users to learn what parameters create the optimal "whoosh" (or other haptic effect) for at least one of a given user, type of media, or particular scene.

As shown in FIG. 4, the output tool 216 generates an output haptics file 430 based on the media content 202 and speech marks file 410. In one embodiment, the output tool 216 transforms at least one of the haptic events (within haptic data 422) or the media content 202 into a haptics JavaScript Object Notation (JSON) format and uses the haptics JSON format for the output haptics file 430. Note, however, that this is merely an example of a format that can be used for the output haptics file 430 and that the output tool 216 can use any format for the output haptics file 430 consistent with the functionality described herein. The output haptics file 430 may have the same duration as the speech marks file 410 with null data for time regions without any haptics. The output tool 216 may transmit the output haptics file 430, speech marks 420, and the media content 202 to the streaming system 130.

The streaming system 130 distributes (or transmits) the output haptics file 430, speech marks 420, and the media content 202 to the client system 110. In some embodiments, the streaming system 130 syncs the output haptics file 430 with the media content 202 before it is streamed to the client system 110. In some embodiments, the output haptics file 430 is integrated into a transport stream used for the media content 202. In this manner, the streaming client 114 may parse the information and generate the haptic effects at the appropriate timestamp along with the playback of the media content 202.

Figure 5:
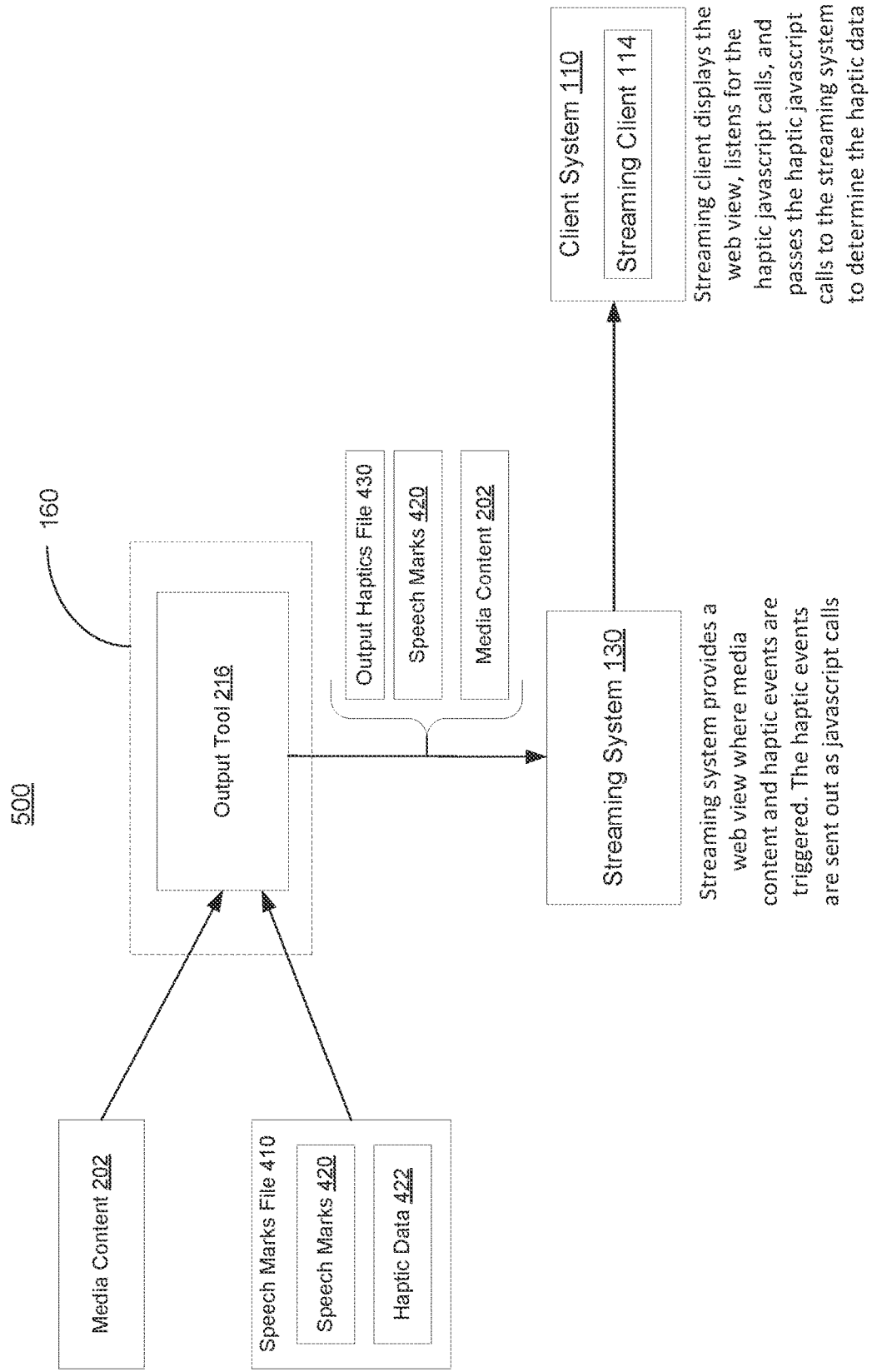
FIG. 5 illustrates another example workflow for haptics data transmission, according to embodiments of the present disclosure.

FIG. 5 illustrates an example workflow 500 for haptics data transmission (or haptics data distribution) to a client system, according to one embodiment. Compared to the workflow 400, in the workflow 500, the streaming system 130 provides a (web) view of the media content 202 in which the haptic events (in the output haptics file 430) are triggered. For example, the haptic events may be sent out as javascript calls. Here, as opposed to the streaming client 114 generating haptic effects based on predefined haptic events, the streaming client 114 may display the (web) view, listen for the haptic javascript calls, and pass the haptic javascript calls to the streaming system 130 in order to determine which haptic effects to generate at the appropriate timestamps.

Figure 6:
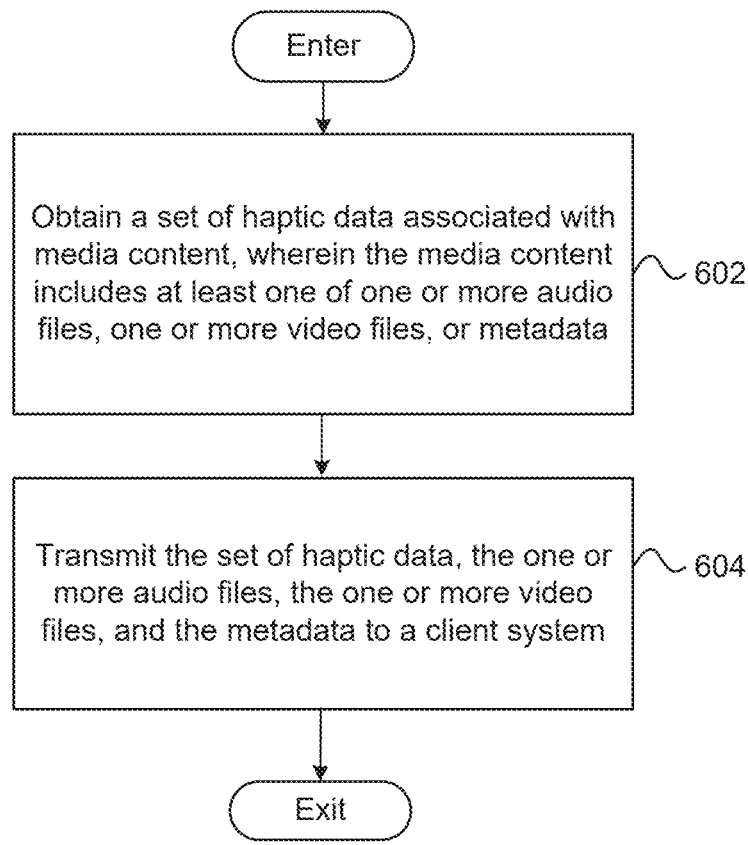
FIG. 6 is a flowchart of a method for transmitting haptic data for media content, according to embodiments of the present disclosure.

FIG. 6 is a flowchart of a method 600 for transmitting (or distributing) haptic data for media content, according to one embodiment. The method 600 may be performed by one or more components of the computing environment 100. In one particular embodiment, the method 600 is performed by a computing system (e.g., streaming system 130).

Method 600 enters at block 602, where the computing system obtains a set of haptic data (e.g., haptic data 220, haptic data 222, haptic data 422) associated with media content (e.g., media content 202). The media content includes at least one of one or more audio files (e.g., audio 204), one or more video files (e.g., video 206), or metadata (e.g., speech marks file 410).

In one embodiment, the set of haptic data includes multiple haptic files (e.g., haptic files 230), each indicating haptic effects to be generated during streaming of the media content. In one example, each of the haptic files may be associated with a different type of client device (e.g., client system 110). In another example, each of the haptic files may be associated with a different set of capabilities of a client device. In another example, each of the haptic files may be associated with a different amount of available resources of a client device.

In one embodiment, each haptic file may include a timestamped series of metadata that describes one or more haptic event tags. For example, each haptic event may correspond to a predefined set of haptic effects, based on a particular key-value dictionary pair. In another example, the set of haptic effects corresponding to each haptic event may be determined using ML techniques.

At block 604, the computing system transmits the set of haptic data, the one or more audio files, the one or more video files, and the metadata to the client system 110. In one embodiment, the computing system may transmit the set of haptic data, the one or more audio files, the one or more video files, and the metadata in a transport stream. In one embodiment, the computing system may generate a manifest file that includes the set of haptic data, the one or more audio files, the one or more video files, and the metadata, and the computing system may transmit the manifest file.

Referring back to FIG. 1, the client system 110 may receive the haptic data along with the media content and may synchronize video playback with the haptic devices 118 using a communication protocol (e.g., WiFi, Bluetooth, audio networking, etc.). In some embodiments, during video playback, the client system 110 may automatically turn off notifications or other vibrations that are not associated with the media content being shown on the client system 110.

In some embodiments, the client system 110 adjusts the haptic effects that are generated based on one or more conditions. The client system 110 may adjust the generated haptic effects by increasing (or adding) a number of haptic effects that are generated, reducing (or removing) a number of haptic effects that are generated, increasing an intensity of the generated haptic effects, reducing an intensity of the generated haptic effects, increasing a frequency of the generated haptic effects, decreasing a frequency of the generated haptic effects, changing a type of the haptic effects (e.g., changing from a transient haptic effect to a continuous haptic effect, or vice versa), or a combination thereof. In one embodiment described below with respect to FIG. 7, the client system 110 may automatically adjust the haptic effects based on adjusting the haptic data received from another computing system (e.g., streaming system 130, computing system 150, etc.). For example, the client system 110 may use one or more components of the haptic component 160 to dynamically adjust the haptic data. In another embodiment described below with respect to FIG. 8, the client system 110 may automatically adjust the haptic effects by selecting a different set of haptic data received from another computing system (e.g., streaming system 130, computing system 150, etc.). For example, the client system 110 may receive a set of haptic files, each containing a different set of haptic data. The client system 110 may dynamically switch to generating haptic feedback based on a particular haptic file, based on conditions (e.g., environmental conditions, available resources, accessibility factors, etc.) detected by the client system 110.

In some embodiments, the client system 110 adjusts the haptic effects, based on one or more available resources associated with the client system 110. Such resources can include, but are not limited to, battery, haptics hardware capability, generated heat, environment (e.g., altitude, pressure, etc.), bitrate, available bandwidth, etc. In some embodiments, the client system 110 adjusts the haptic effects, based on one or more environmental conditions. For example, assume that the haptic data 222 calls for a "barely perceptible" haptic effect. In this example, the client system 110 may initially generate a heartbeat haptic effect using the haptic device(s) 118. Then to make the heartbeat haptic barely perceptible, the client system 110 can adjust the intensity of the heartbeat haptic effect based on at least one of an accelerometer tilt, electrical impedance, a number of fingers that are detected on the touchscreen of the client system 110 (e.g., as an approximation of how tightly the user is gripping the client system 110), and other device metrics. In this manner, the client system can tune the perceptibility of generated haptic effects to achieve the appropriate level based on current environmental conditions.

In some embodiments, the client system 110 can heighten or dampen a user's experience of the media content 202 by switching to at least one of different portions of the media content 202 or different haptic effects based on one or more user attributes and environmental conditions. For example, during playback of the media content 202, the client system 110 may determine (based on a user profile) that the user of the client system 110 has a proclivity towards being overwhelmed by haptic effects and may detect, using one or more sensors (e.g., heart rate sensor, electrical impedance, etc.) of the client system 110, that the user is currently overwhelmed by at least one of the media content 202 or the generated haptic effects. In response to this detection, the client system 110 can at least one of (i) reduce an intensity of the generated haptic effects, (ii) reduce an amount of the generated haptic effects, or (iii) switch to a different portion of the media content 202 with less intensity.

In some embodiments, the client system 110 supports multi-channel haptics to provide a spatial haptics experience. The client system 110 can output haptics using a communication protocol (e.g., WiFi, Bluetooth, etc.) to multiple haptic devices 118. For multi-channel haptics, the haptic devices 118 can use different types of haptics, including for example, haptics tweeters, haptics subwoofers, air compression, water jet, temperature, electro-stimulation, force feedback (e.g., pressure, solenoid tap), etc. In one embodiment, the haptic files 230 may be segmented into a multi-channel format that allows for outputting to different types of haptic devices.

In some embodiments, the client system 110 may include a multi-channel display for multi-channel haptics. For example, the client system 110 can include a spatially aware multi-channel haptics design (for visual and audio). The client system 110 may employ machine learning techniques to assign different portions of the haptic data to different haptics display channels. For example, low frequency audio may be assigned to low frequency haptics, which may be assigned to a specific haptics display channel. In some cases, haptics can be displayed simultaneously across multiple client systems (e.g., phone, watch, seat cushion, bracelets, vest, gloves, headsets, etc.). The segmentation of the haptic data into the different devices may be based on amplitude and frequency. For example, low frequency continuous haptics may be sent to the seat cushion, and transient haptics may be sent to bracelets.

In some embodiments, the client system 110 may present a user interface that allows a user to select between different haptic experiences. For example, a user may select to experience haptic effects in a certain accessibility format/standard. In one example, the client system 110 may provide a haptic braille feature that can be selected by the user. In one example, the client system 110 may allow for a multi-channel haptics track selection. For instance, the user interface may include one or more player settings, which allow the user to select haptics tracks that focus on different elements (e.g., soundtrack, sound features, visual features, visual actions, accessibility, voice, etc.). In some cases, there may be separate haptics tracks for general audience users, users with an auditory impairment, and users with a visual impairment.

Figure 7:
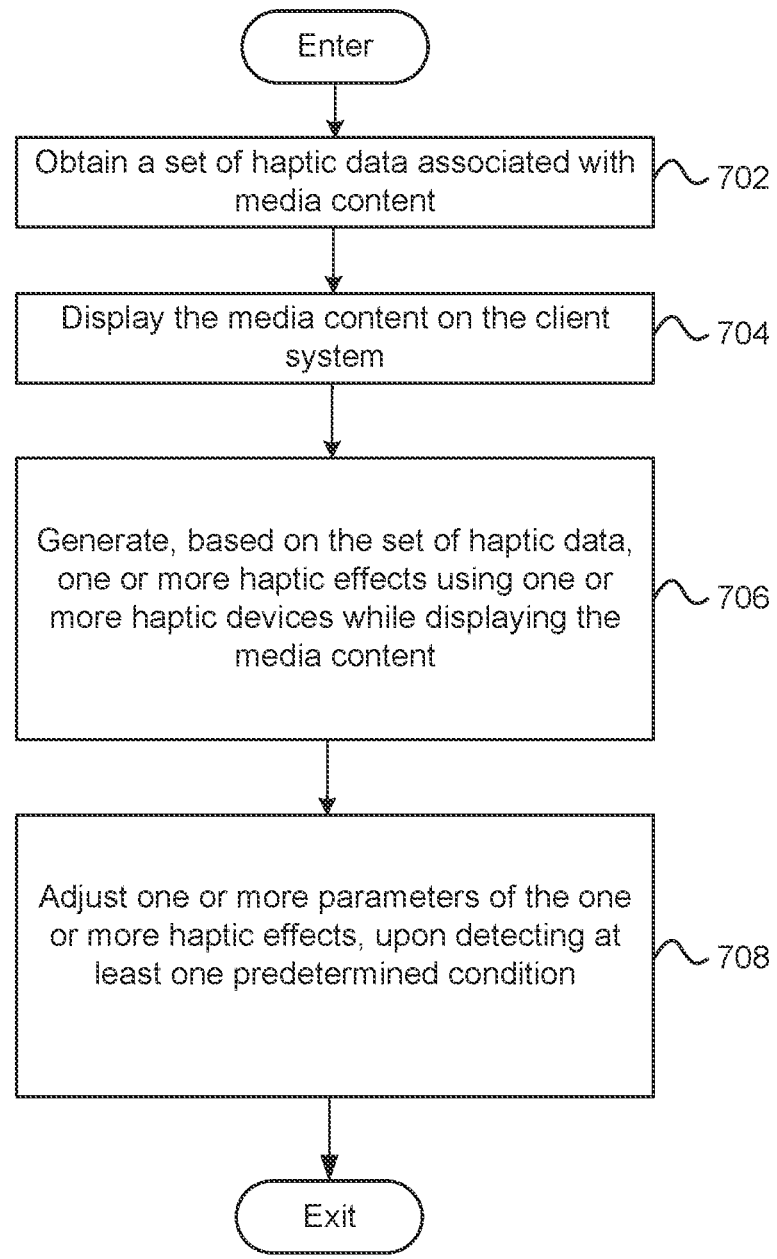
FIG. 7 is a flowchart of a method for generating haptic effects based on haptic data, according to embodiments of the present disclosure.

FIG. 7 is a flowchart of a method 700 for generating haptic effects on a client system (e.g., client system 110), according to one embodiment. The method 700 may be performed by one or more components of the computing environment 100. In one particular embodiment, the method 700 is performed by the client system (e.g., client system 110).

Method 700 enters at block 702, where the client system obtains a set of haptic data associated with media content (e.g., media content 202). At block 704, the client system displays the media content on the client system (e.g., on a user interface of the client system).

At block 706, the client system generates, based on the set of haptic data, one or more haptic effects using one or more haptic devices while displaying the media content.

At block 708, the client system adjusts one or more parameters of the one or more haptic effects, upon detecting at least one predetermined condition. The one or parameters can include a number (or amount) of the one or more haptic effects, an intensity of the one or more haptic effects, a frequency of the one or more haptic effects, a type of the one or more haptic effects, etc. The predetermined condition may be based on one or more environmental conditions, one or more device metrics, a resource constraint, etc. The method 700 may then exit.

Figure 8:
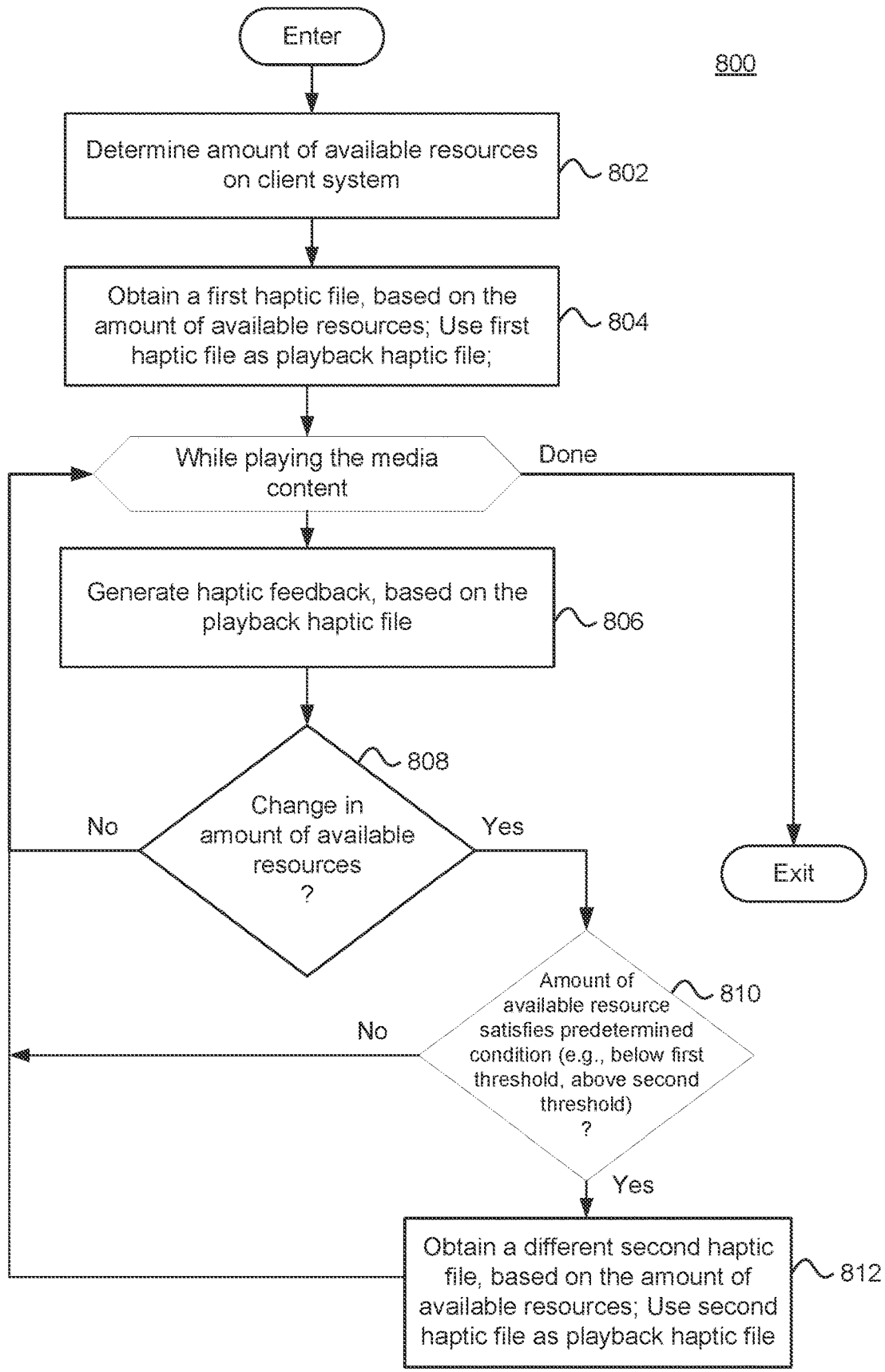
FIG. 8 is a flowchart of a method for adjusting haptic effects on a computing system, according to embodiments of the present disclosure.

FIG. 8 is a flowchart of a method 800 for adjusting haptic effects on a client system (e.g., client system 110), according to one embodiment. The method 800 may be performed by one or more components of the computing environment 100. In one particular embodiment, the method 800 is performed by the client system.

Method 800 enters at block 802, where the client system determines an amount of available resources. At block 804, the client system obtains a first haptic file, based on the amount of available resources. The client system uses the first haptic file as a playback haptic file. While playing media content, the client system generates haptic effects, based on the playback haptic file (block 806).

At block 808, the client system determines whether there is a change in the amount of available resources. If not, the method proceeds to block 806. If there is a change in the amount of available resources, the client system determines whether the amount of available resources satisfies a predetermined condition (block 810). For example, the client system can determine whether the amount of available resources is below a first threshold or exceeds a second threshold. If the amount of available resources satisfies the predetermined condition, the client system obtains a different second haptic file, based on the amount of available resources and uses the second haptic file as the playback haptic file (block 812). The method then proceeds to block 806.

For example, if the client system 110 determines that an amount of available resources is less than a predefined threshold, then the client system 110 can select and use a first haptic file (e.g., haptic file 230) that uses a lower amount of resources (e.g. lower resolution, weaker or delayed response, etc.). On the other hand, if the client system 110 determines that the amount of available resources exceeds a predefined threshold, the client system 110 can select and use a second haptic file that uses a greater amount of resources (e.g. higher resolution, stronger or faster response, etc.). In this embodiment, the first haptic file may be associated with "lower quality/detail" haptic effects and the second haptic file may be associated with "higher quality/detail" haptic effects. In some cases, the client system 110 can dynamically adjust video, audio and haptics, e.g., by stalling, pre-loading, etc., based on monitoring the amount of available resources. In one embodiment, the client system 110 may choose different haptic files, so that there is a graceful degradation or increase of the haptic effects. For example, the client system 110 may change the amplitude, frequency, and duration of the haptics on a fine scale.

Figure 9:
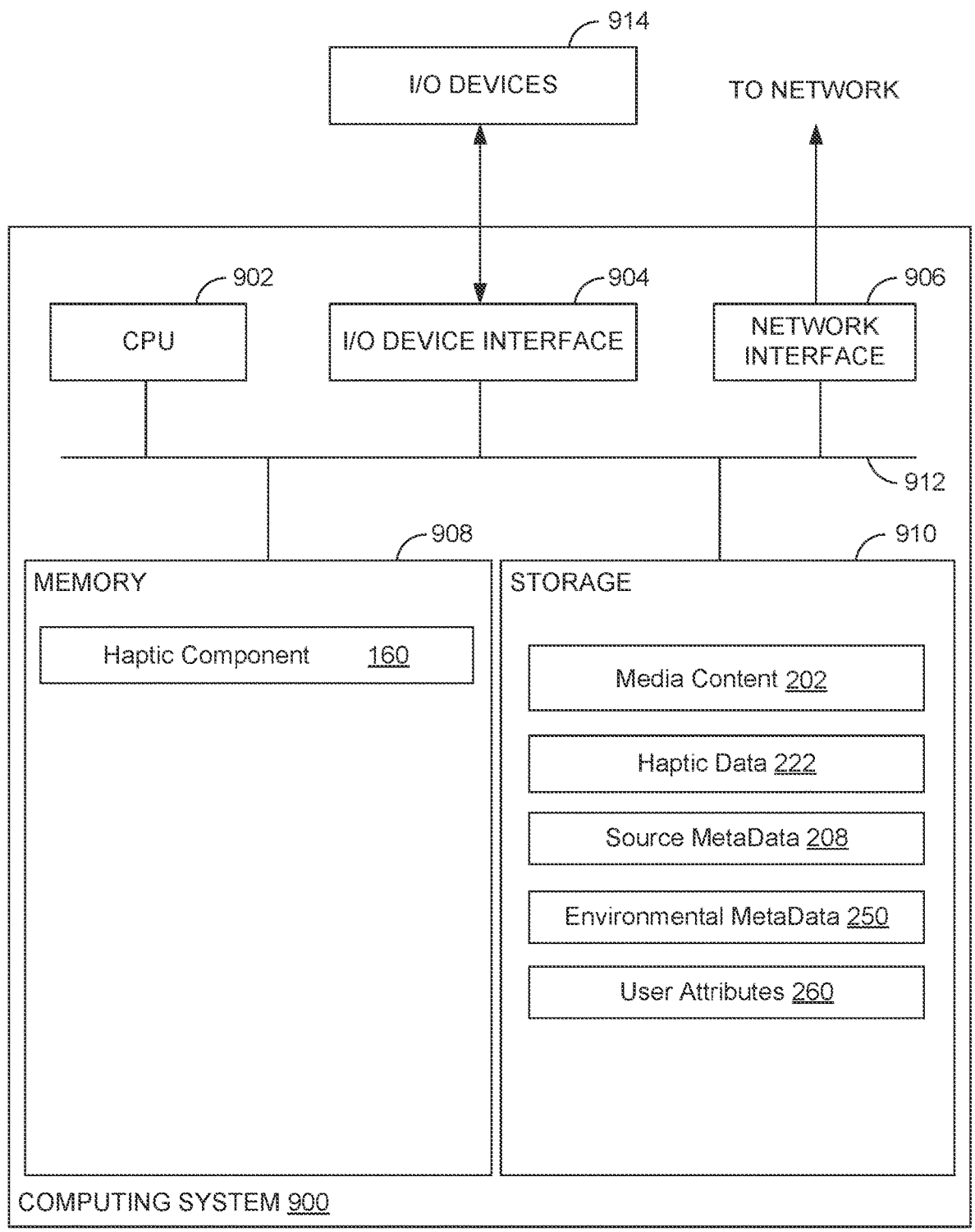
FIG. 9 illustrates an example computing system that performs haptics data generation and transmission, according to embodiments of the present disclosure.

FIG. 9 illustrates an exemplary computing system 900 that performs one or more techniques described herein for generating and transmitting haptics data for media content, according to one embodiment. In one embodiment, the computing system 900 is a representative example of the computing system 150 depicted in FIG. 1. In another embodiment, the computing system 900 is a representative example of the streaming system 130 depicted in FIG. 1. As shown, the computing system 900 includes a central processing unit (CPU) 902, one or more I/O device interfaces 904, which may allow for the connection of various I/O devices 914 (e.g., keyboards, displays, mouse devices, pen input, etc.) to computing system 900, network interface 906 (which may include a transmitter for transmitting data and a receiver for receiving data), memory 908, storage 910, and interconnect 912. Storage 910 can be located either inside or outside the computing system 900. When the storage is located outside computing system 900, the storage can be connected via the network 140.

CPU 902 may retrieve and execute programming instructions stored in the memory 908. Similarly, CPU 902 may retrieve and store application data residing in the memory 908. Interconnect 912 transmits programming instructions and application data, among the CPU 902, I/O device interface 904, network interface 906, memory 908, and storage 910. CPU 902 can represent a single CPU, multiple CPUs, a single CPU having multiple processing cores, and the like. Additionally, memory 908 may represent volatile memory, such as random access memory. Furthermore, storage 910 may represent non-volatile memory, such as memory on a disk drive. Although shown as a single unit, storage 910 may be a combination of fixed or removable storage devices, such as fixed disc drives, removable memory cards or optical storage, network attached storage (NAS), or a storage area-network (SAN). As shown, memory 908 stores programming instructions for executing haptic component 160, described in more detail above. Storage 910 stores media content 202, haptic data 222, source metadata 208, environmental metadata 250, and user attributes 260, described in more detail above.

Figure 10:
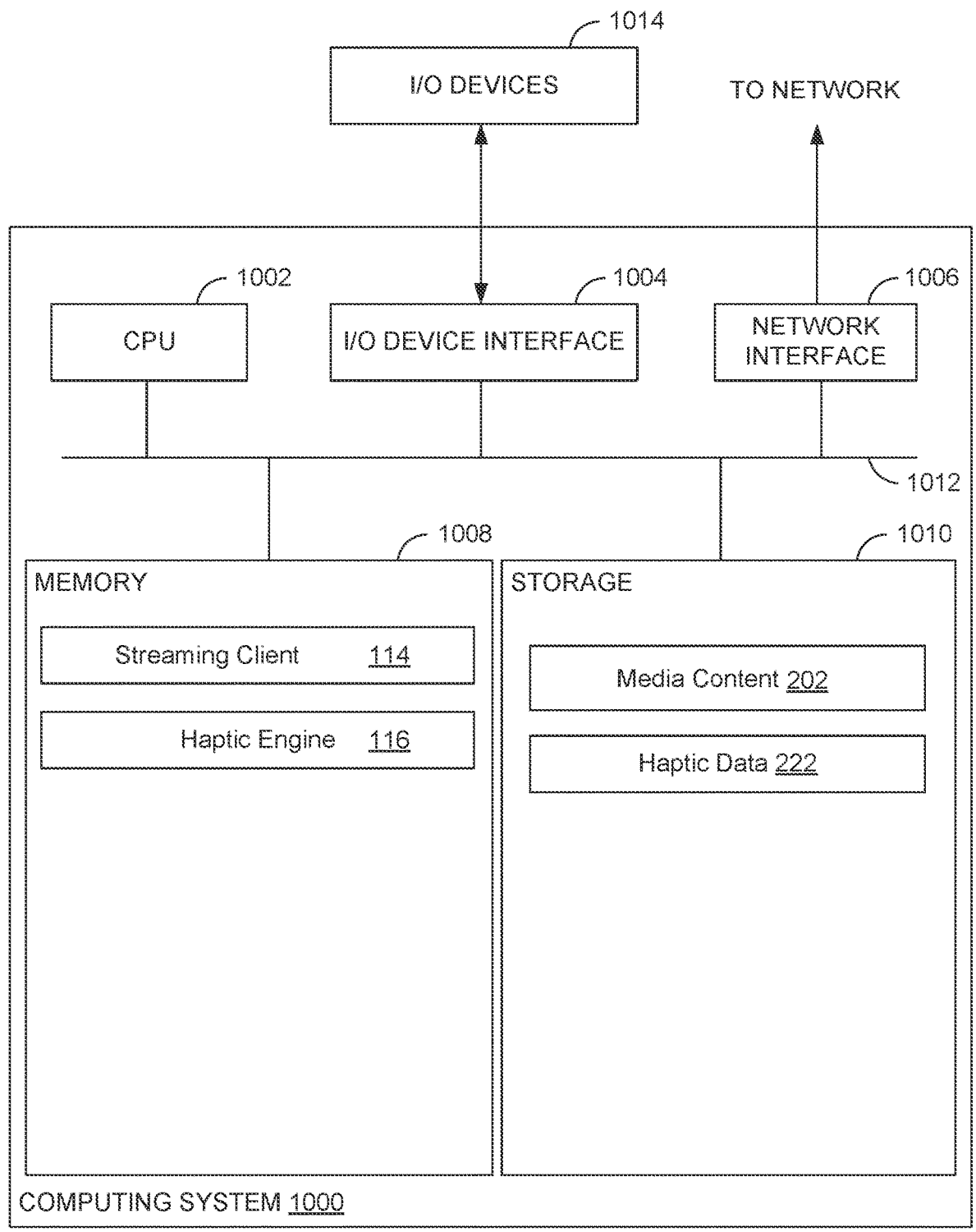
FIG. 10 illustrates an example computing system that performs haptic effect generation based on haptic data, according to embodiments of the present disclosure.

FIG. 10 illustrates an exemplary computing system 1000 that performs one or more techniques described herein for generating haptic effects, according to one embodiment. In one embodiment, the computing system 1000 is a representative example of the client system 110 depicted in FIG. 1. As shown, the computing system 1000 includes a central processing unit (CPU) 1002, one or more I/O device interfaces 1004, which may allow for the connection of various I/O devices 1014 (e.g., keyboards, displays, mouse devices, pen input, etc.) to computing system 1000, network interface 1006 (which may include a transmitter for transmitting data and a receiver for receiving data), memory 1008, storage 1010, and interconnect 1012. Storage 1010 can be located either inside or outside the computing system 1000. When the storage is located outside computing system 1000, the storage can be connected via the network 140.

CPU 1002 may retrieve and execute programming instructions stored in the memory 1008. Similarly, CPU 1002 may retrieve and store application data residing in the memory 1008. Interconnect 1012 transmits programming instructions and application data, among the CPU 1002, I/O device interface 1004, network interface 1006, memory 1008, and storage 1010. CPU 1002 can represent a single CPU, multiple CPUs, a single CPU having multiple processing cores, and the like. Additionally, memory 1008 may represent volatile memory, such as random access memory. Furthermore, storage 1010 may represent non-volatile memory, such as memory on a disk drive. Although shown as a single unit, storage 1010 may be a combination of fixed or removable storage devices, such as fixed disc drives, removable memory cards or optical storage, network attached storage (NAS), or a storage area-network (SAN). As shown, memory 1008 stores programming instructions for executing streaming client 114 and haptic engine 116, described in more detail above. Storage 1010 stores media content 202 and haptic data 222, described in more detail above.

Note that while many of the embodiments herein describe generating haptic data in the context of a streaming environment, embodiments described herein can be used in other types of environments. In some embodiments, techniques described herein can be used to generate haptics for users in an amusement park or stadium. In these embodiments, the haptics can be used for emergency services (e.g., for deaf users), navigation services (e.g., for blind users), etc. In some embodiments, techniques described herein can be used to generate haptics for rides in an amusement park. In these embodiments, the haptics may be used as part of a mobile companion experience with media content associated with a particular ride. The media content may be shown to the users while users are waiting in line, while users are on the ride, while users are exiting the ride, etc.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method comprising:
   obtaining a first set of haptic data associated with media content being streamed to a first computing device;
   displaying the media content on the first computing device;
   generating, based on the first set of haptic data, one or more haptic effects using one or more haptic devices associated with the first computing device, while displaying the media content;
   determining, by the first computing device, resources available at a first point in time on the first computing device while displaying the media content; and
   upon detecting one or more conditions, dynamically adjusting (i) the media content and (ii) one or more parameters of the one or more haptic effects generated using the one or more haptic devices, based on the resources available at the first point in time on the first computing device, the resources comprising a quality of connection between the first computing device and a second computing device, wherein dynamically adjusting the one or more parameters comprises:
      requesting, by the first computing device, (i) a second set of haptic data, different from the first set of haptic data and associated with the media content and (ii) a third set of haptic data, different from the first set of haptic data and the second set of haptic data and associated with the media content, based on the resources available at the first point in time on the first computing device; and
      generating the one or more haptic effects according to the second set of haptic data and the third set of haptic data.

2. The computer-implemented method of claim 1, wherein the one or more parameters comprise an amount of the one or more haptic effects generated using the one or more haptic devices.

3. The computer-implemented method of claim 1, wherein the one or more parameters comprise an intensity of the one or more haptic effects generated using the one or more haptic devices.

4. The computer-implemented method of claim 1, wherein the one or more parameters comprise a frequency of the one or more haptic effects generated using the one or more haptic devices.

5. The computer-implemented method of claim 1, wherein obtaining the first set of haptic data comprises requesting the first set of haptic data based on the resources available at a second point in time.

6. The computer-implemented method of claim 1, wherein the one or more conditions comprises an amount of the resources available at the first point in time being less than a threshold.

7. The computer-implemented method of claim 1, wherein the one or more conditions comprises an amount of the resources available at the first point in time exceeding a threshold.

8. The computer-implemented method of claim 1, wherein the one or more conditions comprises the quality of connection between the first computing device and the second computing device being less than a threshold.

9. The computer-implemented method of claim 1, wherein the one or more haptic effects is generated on a second computing device while the media content is played on the first computing device.

10. The computer-implemented method of claim 1, further comprising controlling the one or more parameters of the one or more haptic effects, based on input received via a user interface of the first computing device.

11. The computer-implemented method of claim 1, wherein the one or more conditions is based on at least one of (i) one or more environmental conditions or (ii) one or more accessibility factors associated with a user of the first computing device.

12. A computing device comprising:
   one or more memories collectively storing instructions; and
   one or more processors communicatively coupled to the one or more memories, the one or more processors being collectively configured to execute the instructions to cause the computing device to perform an operation comprising:
      obtaining a first set of haptic data associated with media content being streamed to the computing device;
      displaying the media content on the computing device;
      generating, based on the first set of haptic data, one or more haptic effects using one or more haptic devices associated with the computing device while displaying the media content;
      determining resources available at a first point in time on the computing device while displaying the media content; and
      upon detecting one or more conditions, dynamically adjusting (i) the media content and (ii) one or more parameters of the one or more haptic effects generated using the one or more haptic devices, based on the resources available at the first point in time on the computing device, the resources comprising a quality of connection between the computing device and another computing device, wherein dynamically adjusting the one or more parameters comprises:
         requesting (i) a second set of haptic data, different from the first set of haptic data and associated with the media content and (ii) a third set of haptic data, different from the first set of haptic data and the second set of haptic data and associated with the media content, based on the resources available at the first point in time on the computing device; and
         generating the one or more haptic effects according to the second set of haptic data and the third set of haptic data.

13. The computing device of claim 12, wherein the one or more parameters comprise at least one of (i) an amount of the one or more haptic effects generated using the one or more haptic devices, (ii) an intensity of the one or more haptic effects generated using the one or more haptic devices, or (iii) a frequency of the one or more haptic effects generated using the one or more haptic devices.

14. The computing device of claim 12, wherein obtaining the first set of haptic data comprises requesting the first set of haptic data based on the resources available at a second point in time.

15. The computing device of claim 12, wherein the one or more conditions comprises (i) an amount of the resources available at the first point in time being less than a threshold, (ii) an amount of the resources available at the first point in time exceeding a threshold, or (iii) the quality of connection between the computing device and the other computing device being less than a threshold.

16. The computing device of claim 12, wherein the one or more conditions is based on at least one of one or more environmental conditions or one or more accessibility factors associated with a user of the computing device.

17. A non-transitory computer-readable medium containing computer program code that, when collectively executed by operation of one or more computer processors, performs an operation comprising:
- obtaining a first set of haptic data associated with media content being streamed to a first computing device;
- displaying the media content on the first computing device;
- generating, based on the first set of haptic data, one or more haptic effects using one or more haptic devices associated with the first computing device, while displaying the media content;
- determining, by the first computing device, resources available at a first point in time on the first computing device while displaying the media content; and
- upon detecting one or more conditions, dynamically adjusting (i) the media content and (ii) one or more parameters of the one or more haptic effects generated using the one or more haptic devices, based on the resources available at the first point in time on the first computing device, the resources comprising a quality of connection between the first computing device and a second computing device, wherein adjusting the one or more parameters comprises:
  - requesting, by the first computing device, (i) a second set of haptic data, different from the first set of haptic data and associated with the media content and (ii) a third set of haptic data, different from the first set of haptic data and the second set of haptic data and associated with the media content, based on the resources available at the first point in time on the first computing device; and
  - generating the one or more haptic effects according to the second set of haptic data and the third set of haptic data.

18. The non-transitory computer-readable medium of claim 17, wherein the one or more parameters comprise an amount of the one or more haptic effects generated using the one or more haptic devices.

19. The non-transitory computer-readable medium of claim 17, wherein the one or more parameters comprise an intensity of the one or more haptic effects generated using the one or more haptic devices.

20. The non-transitory computer-readable medium of claim 17, wherein the one or more parameters comprise a frequency of the one or more haptic effects generated using the one or more haptic devices.

\* \* \* \* \*